United States Patent
Kataoka et al.

(10) Patent No.: US 6,807,934 B2
(45) Date of Patent: Oct. 26, 2004

(54) STOP AND START CONTROL APPARATUS OF INTERNAL COMBUSTION ENGINE

(75) Inventors: Kenji Kataoka, Susono (JP); Yasushi Kusaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/762,539

(22) Filed: Jan. 23, 2004

(65) Prior Publication Data
US 2004/0149247 A1 Aug. 5, 2004

(30) Foreign Application Priority Data

Feb. 4, 2003 (JP) ....................................... 2003-027253

(51) Int. Cl.⁷ ............................................... F02N 11/08
(52) U.S. Cl. ............................... 123/179.4; 123/179.3; 290/38 B
(58) Field of Search ........................... 123/179.3, 179.4, 123/179.5, 179.16, 179.28; 180/65.2, 65.3, 65.4; 318/445; 290/31, 38 R, 38 B

(56) References Cited

U.S. PATENT DOCUMENTS

| | | | | |
|---|---|---|---|---|
| 4,364,343 A | * | 12/1982 | Malik | 123/179.4 |
| 6,032,632 A | * | 3/2000 | Bolenz et al. | 123/179.3 |
| 6,098,584 A | * | 8/2000 | Ahner et al. | 123/179.3 |
| 6,098,585 A | * | 8/2000 | Brehob et al. | 123/179.5 |
| 6,250,270 B1 | * | 6/2001 | Ahner et al. | 123/179.3 |
| 6,418,899 B1 | * | 7/2002 | Bluemel et al. | 123/179.3 |
| 6,453,864 B1 | * | 9/2002 | Downs et al. | 123/179.3 |
| 6,581,559 B1 | * | 6/2003 | Grob et al. | 123/179.3 |
| 6,593,713 B2 | * | 7/2003 | Morimoto et al. | 318/139 |
| 6,647,955 B1 | * | 11/2003 | Sieber | 123/322 |

FOREIGN PATENT DOCUMENTS

| | | |
|---|---|---|
| JP | A 2000-283010 | 10/2000 |
| JP | A 2002-4985 | 1/2002 |

* cited by examiner

Primary Examiner—Mahmoud Gimie
Assistant Examiner—Arnold Castro
(74) Attorney, Agent, or Firm—Oliff & Berridge, PLC

(57) ABSTRACT

When a crank angle is controlled to stop at an optimal crank angle stop position by an engine automatic stop control, such as idling stop, or when the crank angle stop position can be estimated with high accuracy, the automatic engine restart is performed by a motor generator serving as an electric motor or an electric generator, at the next time of restarting of the engine. On the other hand, when the crank angle is not controlled to stop at the optimal crank angle stop position, when the crank angle stop position cannot be estimated with the high accuracy, or when the crank angle stop position changes after the stop control, the engine is restarted by a DC starter having an output torque larger than that of a motor generator, at the next time of restarting of the engine.

13 Claims, 12 Drawing Sheets

FIG. 8

| | ABSOLUTE CRANK ANGLE | ACCURACY (RESOLUTION) | CYLINDER DISCRIMINATION | TDC DISCRIMINATION | REVERSE ROTATION DETECTION | AT TIME OF LOW REVOLUTION NUMBER |
|---|---|---|---|---|---|---|
| MG POSITION SIGNAL | ×[BELT SLIP] | 3°CA | × | × | ○ | ○ |
| NE SIGNAL | ○ | 30°CA | × | × | × | ×(○) |
| G2 SIGNAL | △[VVT DEVIATION] | 720°CA | ○ | × | × | ×(○) |
| TDC SIGNAL | ○ | 360°CA | × | ○ | × | ×(○) |

* CASE OF MRE IS GIVEN IN ( )

STOP AND START CONTROL APPARATUS OF INTERNAL COMBUSTION ENGINE

BACKGROUND OF THE INVENTION

1. Field of the Invention

The present invention relates to a stop and start control method of a vehicle which performs a crank angle stop position control at the time of stopping an internal combustion engine and selects an optimal engine start method based on the state of a crank angle stop position after stopping.

2. Description of the Related Art

Recently, there is known an engine stop and start control apparatus for automatically stopping an engine when the vehicle stops and automatically restarting the engine to start the vehicle when an instruction to start is given from the stopped state, in order to reduce a fuel consumption amount and exhaust gas during idling, from the viewpoint of environmental conservation, resources and energy saving or the like.

There is also known an engine start apparatus for restarting the engine by the starter, in which the crankshaft is rotated in reverse direction, before the vehicle starts next time, to the crank angle stop position where the starting torque becomes smaller, when the starter is rotated in the normal direction during the stop control of the vehicle and the crank angle is at the crank angle stop position where the starting torque of the starter is large, in order to improve starting performance at the time of starting the engine. For example, see Japanese Patent Application Laid-Open No. 2000-283010.

In addition, for an identical purpose, there is known an engine start apparatus which performs engine restart by supplying the fuel to a cylinder in an expansion stroke and by igniting the fuel in the cylinder at the time of starting the engine, without operating the starter. For example, see Japanese Patent Application Laid-Open under No. 2002-4985.

However, in the above-described engine start apparatus, if the crank angle cannot be controlled at a desired crank angle stop position by a problem occurring to a crank angle sensor or the like, there is a possibility that the engine restart by the starter fails because the necessary starting torque of the engine becomes larger. Though the engine may be restarted by the starter when the engine restart fails, the drivability is deteriorated because the engine restart cannot be promptly performed under the condition.

Particularly, when the above-described engine restart method is applied to an economic-running vehicle or a hybrid vehicle having the engine stop and start control apparatus capable of automatically stop and start the engine, the problem of the deterioration of the drivability becomes much more serious because the engine stop and the engine start are performed frequently.

SUMMARY OF THE INVENTION

The present invention has been achieved in order to solve the above problems. It is an object of this invention to provide an engine start control method which makes an engine promptly and reliably restart based on the state of a crank angle stop position after a stop control.

According to one aspect of the present invention, there is provided a stop and start control apparatus of an internal combustion engine including a stop control unit which controls a crank angle of the internal combustion engine within a range of a predetermined crank angle at a time of stopping the internal combustion engine, and a start control unit which starts the internal combustion engine by a cranking unit at a time of starting the internal combustion engine, wherein the start control unit starts the internal combustion engine by different methods when there is a probability that the internal combustion engine does not stop within the range of the predetermined crank angle and when the internal combustion engine stops within the range of the predetermined crank angle.

By the above-described stop and start control apparatus of the internal combustion engine, for example, the stop control of the internal combustion engine is performed in the idling stop so that the crank angle is within a predetermined crank angle range. The predetermined crank angle range is prescribed as a crank angle range in which an energy needed to start the engine at the time of the next engine start is small. When the internal combustion engine stops within the predetermined crank angle range at the time of starting, the internal combustion engine is started by a predetermined cranking unit. However, if it is possible that the internal combustion engine does not stop within the predetermined crank angle range, the start is performed by another method which is different from the start method of the internal combustion engine by the above-described cranking unit. Thus, according to the crank angle position after the engine stop, the start of the internal combustion engine can be promptly and reliably performed by an appropriate cranking unit.

The cranking unit may be an electric motor, and the start control unit may start the internal combustion engine by applying, by the electric motor, a larger torque when there is a probability that the internal combustion engine does not stop within the range of the predetermined crank angle than when the internal combustion engine stops within the range of the predetermined crank angle. When there is a probability that the internal combustion engine does not stop within the range of the predetermined crank angle, it is expected that the large torque is needed at the next time of starting. Therefore, the engine is reliably started by giving the large torque by the electric motor in that case.

The start control unit may start the internal combustion engine by a first electric motor when the internal combustion engine stops within the range of the predetermined crank angle, and by a second electric motor different from the first electric motor when there is a probability that the internal combustion engine does not stop within the range of the predetermined crank angle. According to this feature, the electric motors having the large torque and having the small torque are utilized. The electric motor having the small torque is utilized when the engine stops within the range of the predetermined crank angle. The electric motor having the large torque is utilized when there is a probability that the engine does not stop within the range of the predetermined crank angle, thereby to reliably start the engine.

In a preferred embodiment, the first electric motor may be a motor generator functioning as a motor and an electric generator, and the second electric motor may be a DC starter functioning as a motor. According to this feature, the first electric motor, which functions as a motor, can also function as an electric generator. Thus, when the second electric motor functions as an electric generator, charge can be performed by supplying generated power to a power supply unit during braking, such as reducing speed of a vehicle. On the other hand, the second electric motor, which is utilized at the time of the first starting of the internal combustion engine, may be the DC starter functioning as the motor.

The start control unit may start the internal combustion engine by combusting, during an expansion stroke, a fuel supplied at the time of stopping the internal combustion engine when the internal combustion engine stops within the range of the predetermined crank angle, and the start control unit may start the internal combustion engine by the electric motor when there is a probability that the internal combustion engine does not stop within the range of the predetermined crank angle. According to this feature, since the energy for starting the engine is comparatively small when the engine stops within the range of the predetermined crank angle, the internal combustion engine is started by combusting, during the expansion stroke, the fuel supplied at the time of stopping the engine. On the other hand, when there is a probability that the engine stops out of the range of the predetermined crank angle, the electric motor is used to reliably start the engine because the large torque is needed.

In a preferred example, the case when there is a probability that the internal combustion engine does not stop within the range of the predetermined crank angle may be a case when an actual crank angle at the time of stopping the internal combustion engine is out of the range of the predetermined crank angle.

The actual crank angle may be outputted from the crank angle sensor detecting the crank angle of the internal combustion engine. Thus, the actual crank angle can be appropriately and reliably detected.

In another preferred example, the case when there is a probability that the internal combustion engine does not stop within the range of the predetermined crank angle may include a case when an estimation accuracy of an estimating processing of the crank angle at the time of stopping the internal combustion engine is smaller than a predetermined standard.

The estimating processing may estimate the crank angle based on an output from the crank angle sensor of the internal combustion engine and rotation detecting output from the electric motor serving as the cranking unit. According to this feature, since the crank angle is estimated based on the output from the crank angle sensor and the rotation detecting output from the electric motor, the crank angle can be estimated with high accuracy. Moreover, in another example, the estimating processing may correct the rotation detecting output from the electric motor by the output from the crank angle sensor. According to this feature, the electric motor can detect the rotation output of a crankshaft with high accuracy, and at the same time, reverse rotation can also be detected. However, in the rotation detecting output from the electric motor, an accumulative error occurs due to a deviation of the belt connecting a pulley of the electric motor and the crankshaft pulley. Therefore, the amount of the accumulative error is corrected by the output from the crank angle sensor. As a result, the crank angle can be detected as an absolute angle with high accuracy.

In still another preferred example, the case when there is a probability that the internal combustion engine does not stop within the range of the predetermined crank angle may include a case when there is a probability that the crank angle changes after the stop of the internal combustion engine. In still another example, the case when there is a probability that the crank angle changes may be a case when the crank angle changes by receiving an external force after the stop of the internal combustion engine. According to this example, the case when there is a probability that the crank angle changes may be the case when the crank angle changes, e.g., the vehicle is moved due to the external force caused by the slop when the vehicle stops on the climbing lane after stopping of the internal combustion engine.

The stop control unit may automatically stop the internal combustion engine when a predetermined stop condition is satisfied, and the start control unit may automatically start the internal combustion engine when a predetermined start condition is satisfied. According to this feature, the stop and start control of the internal combustion engine according to the present invention can be preferably applied to idling stop control of a so-called economic-running vehicle or a hybrid vehicle. By this, an appropriate cranking unit can be selected in accordance with the state of the crank angle stop position after the stop control, and the internal combustion engine can be promptly and reliably started.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 8 is a table showing characteristics of each sensor output signal used for crank angle estimating processing;

DETAILED DESCRIPTION OF THE PREFERRED EMBODIMENT

Preferred embodiments of the present invention will be explained below with reference to the attached drawings.
[Configuration of Vehicle]
First, the description will be given of a schematic configuration of a vehicle to which a stop and start control of an internal combustion engine according to the present invention is applied. A stop control apparatus of the internal combustion engine according to the present invention is intended for so-called "economic-running" vehicles, hybrid vehicles and the like to which idling stop technique is applied. "An economic-running vehicle" is a vehicle which is equipped with an electric motor (motor generator) mainly for the purpose of starting the engine and which automatically restarts the engine by the motor generator after stopping the engine by the idling stop control. "A hybrid vehicle" is a power train using an engine and a motor generator as power sources. In a hybrid vehicle, both the engine and the motor generator work in combination in accordance with a running state, or are separately used, and power performance which is smooth and excellent in response can be obtained.

Figure 1:
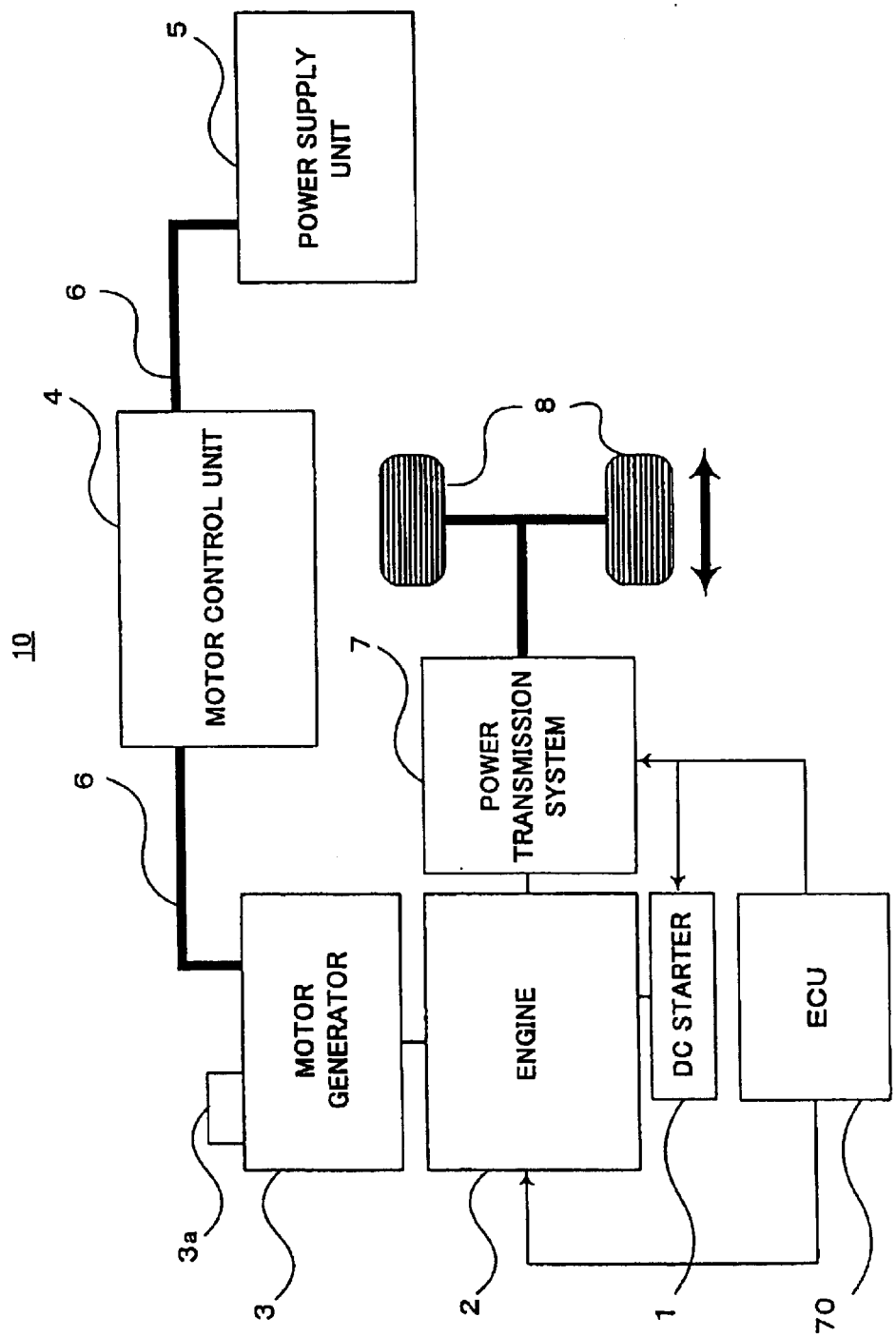
FIG. 1 shows a system configuration of a vehicle to which an engine stop and start control, according to the present invention, is applied.

FIG. 1 shows a system configuration of a vehicle 10 according to the present invention.

As shown in FIG. 1, the vehicle 10 includes a DC starter 1, an engine 2, a motor generator 3 which generates electricity by a driving force outputted from the engine 2 and is drivable as a cell motor on the occasion of starting the engine 2, a motor control unit 4 to control the motor generator 3 and the like, a power supply unit 5 for exchanging electric power with the motor generator 3 and the like via the motor control unit 4, a power supply cable 6 for connecting the motor generator 3, the motor control unit 4 and the power supply unit 5, respectively, a power transmission system 7 for transmitting a driving force generated from the engine 2 to wheels, and the wheels 8.

Next, each of the above-described units will be explained with reference to FIG. 1.

The DC starter 1 is a dc-type cell motor for starting the engine 2. The DC starter 1 has a shaft, receives a power supply from a 12V power supply unit when an ignition switch is turned to an ON state, and rotates the shaft. By the rotation of the shaft of the DC starter 1, a crankshaft of the engine 2 is rotated and the engine 2 is started. Specifically, a pinion gear is mounted on a tip end portion of the shaft of the DC starter 1. The pinion gear is meshed with a ring gear of a flywheel provided at the crankshaft of the engine 2. Consequently, when the DC starter 1 receives a power supply from the 12V power supply unit by the start of the engine 2, the pinion gear is meshed with the ring gear of the flywheel and rotated to rotate the flywheel. As a result, the crankshaft with a predetermined number of pistons being connected is rotated, and therefore the engine 2 can be started by the rotational driving force. Driving the crankshaft to start the engine is called "cranking".

The engine 2 is the internal combustion engine for generating power by exploding air-fuel mixtures (hereinafter simply referred to as "mixture") in cylinders. There are gasoline engines with gasoline as a fuel, diesel engines with light oil and the like as a fuel, and the like as the internal combustion engines. As the gasoline engines, there are four-cycle gasoline engines which complete one cycle of intake, compression, expansion and exhaust during two rotations of crankshaft to generate power, and two-cycle gasoline engines which complete the aforementioned one cycle during one rotation of crankshaft. The vehicle 10 in this embodiment is assumed to be the four-cycle gasoline engine.

Figure 2:
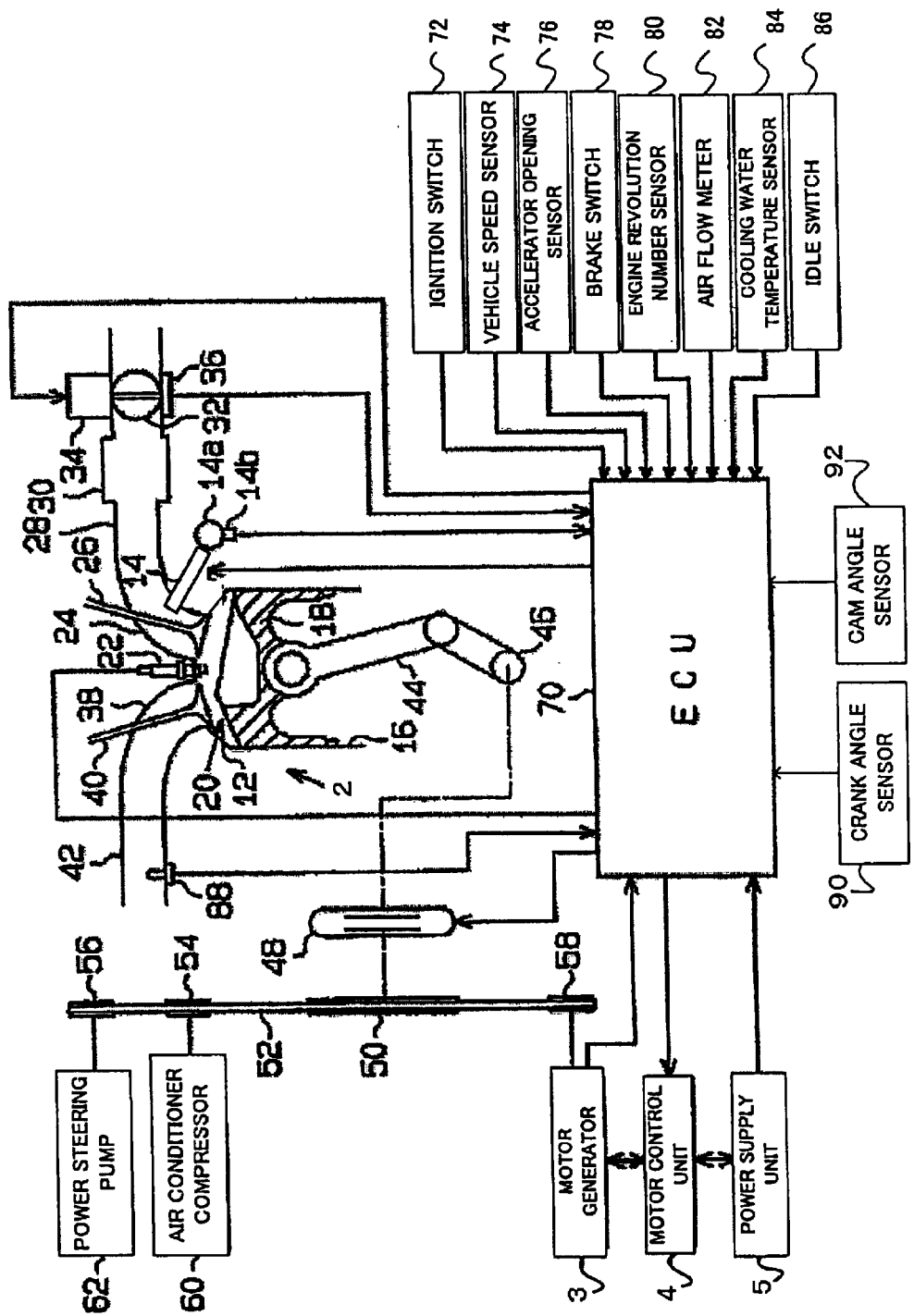
FIG. 2 is a schematic block diagram of an engine according to the present invention.

FIG. 2 shows one example of a schematic configuration of the engine 2.

An intake port 24 formed at a cylinder head 12 is opened and closed by an intake valve 26. Intake air is supplied into the intake port 24 via an intake passage 28. The intake passage 28 is provided with a surge tank 30, and a throttle valve 32 is provided at an upstream of the surge tank 30. An opening (throttle opening TA) of the throttle valve 32 is adjusted by an electric motor 34, and the throttle opening TA is detected by a throttle opening sensor 36.

The engine 2 is a so-called port-injection type engine, and the intake port 24 is provided with a fuel injection valve 14. An air-fuel mixture is generated by the intake air inside the intake port 24 and the fuel injected into the intake port 24, and is introduced into the combustion chamber 20 partitioned by the cylinder block 16, the piston 18 and the cylinder head 12. The ignition plug 22 is disposed at a ceiling portion of the combustion chamber 20, and ignites the mixture introduced from the intake port 24. High pressure fuel is supplied to the fuel injection valve 14 from a high pressure fuel pump (not shown) via a delivery pipe 14a. This enables the injection of fuel into the combustion chamber 20 from the fuel injection valve 14 even in the last period of the compression stroke. Fuel pressure in the delivery pipe 14a is detected by the fuel pressure sensor 14b.

The exhaust port 38 formed at the cylinder head 12 is opened and closed by the exhaust valve 40. Exhaust gas discharged to the exhaust port 38 from the combustion chamber 20 is discharged to the outside via the exhaust passage 42, an exhaust gas purifying catalyst (not shown) and the like.

Reciprocal movement of the piston 18 generated by the combustion of the mixture inside the combustion chamber 20 is converted into rotational movement of the crankshaft 46 via the connecting rod 44. The crankshaft 46 transmits power to the wheels 8 via a torque converter and a transmission not shown.

Apart from such a power transmission system, one end of the crankshaft 46 is connected to the pulley 50 (hereinafter, also called "crankshaft pulley") via the electromagnetic clutch 48. The pulley 50 is capable of transmitting power to and from other three pulleys 54, 56 and 58 by the belt 52. In this example, the compressor 60 for an air conditioner is made drivable by the pulley 54, and the power steering pump 62 is made drivable by the pulley 56. The other pulley 58 (hereinafter, also called "MG pulley") is connected to the motor generator 3. The motor generator 3 has a function as a generator for generating power by the engine driving force from the side of the MG pulley 58, and a function as a motor for supplying the driving force of the motor generator 3 to the side of the MG pulley 58. An ECU 70 (Engine Control Unit) mainly constructed with a microcomputer includes an input-output device, a storage device, a central processing unit and the like, and supervises and controls the whole system of the vehicle 10. The ECU 70 controls the vehicle 10 to be in an optimal condition based on input information from each sensor and the like provided on the engine 2. Specifically, the ECU 70 detects the fuel pressure from the aforementioned fuel pressure sensor 14b, the throttle opening TA from the throttle opening sensor 36, a revolving number of motor generator from a rotational frequency sensor included in the motor generator 3, the voltage of the power supply unit 5 or the current amount of the power supply unit 5 at the time of charge and discharge, a switching state of the ignition switch 72, a vehicle speed SPD from the vehicle speed sensor 74, a stamping or depressing amount on an accelerator pedal (accelerator opening ACCP) from the accelerator opening sensor 76, presence or absence of stamping on a brake pedal from the brake switch 78, a number of revolution of the crankshaft 46 (i.e., number of engine revolution NE) from an engine revolution number sensor 80, an intake air amount GA from the air flow meter 82, the engine cooling water temperature THW from the cooling water temperature sensor 84, presence or absence of stamping on the accelerator pedal from the idle switch 86, an air fuel ratio detection value Vox from the air fuel ratio sensor 88 provided in the exhaust passage 42, a rotation position of a camshaft from the cam angle sensor 92, and a rotation angle (crank angle) of the crankshaft from the crank angle sensor 90, respectively.

The crank angle sensor 90 is a magnetic type sensor or the like capable of detecting an object to be detected (for example, metal and the like), and is provided at a predetermined position near the crankshaft 46 in the engine 2. Namely, a gear with projections and depressions being formed on an outer circumference (hereinafter, called "signal rotor") is attached at a predetermined position on the crankshaft 46, and the crank angle sensor 90 is provided at an appropriate position to detect the number of teeth of the signal rotor. The crank angle sensor 90 can detect the rotation angle of the crankshaft 46 (hereinafter, called "crank angle") with resolution of, for example, about 10° to 30° CA. When the crankshaft 46 is rotated, the signal rotor also rotates in synchronization with the crankshaft 46. In this situation, the crank angle sensor 90 detects the number of teeth of the signal rotor and outputs it to the ECU 70 and the like as a pulse signal. The ECU 70 counts the pulse signal outputted from the crank angle sensor 90, and converts it into a crank angle. Thus, the ECU 70 and the like detect the crank angle. The crank angle sensor 90 is directly provided in the engine 2, and therefore it can detect the crank angle as an absolute angle.

The crank angle sensor 90 outputs one pulse signal to the ECU 70 and the like when it detects one of teeth of the signal rotor. Consequently, the pulse signal outputted from the crank angle sensor 90 is in the same output state irrespective of whether the crankshaft 46 is rotated in a normal direction or a reverse direction, and therefore the ECU 70 and the like cannot detect whether the rotation of the crankshaft 46 is in the normal direction or in the reverse direction.

Based on the data thus obtained, the ECU 70 drives the electric motor 34 to adjust the throttle opening TA, and adjusts the injection timing of the fuel by the fuel injection valve 14. Further, when an automatic stop condition is established, the ECU 70 controls the fuel injection from the fuel injection valve 14 to automatically stop the operation of the engine 2. When an automatic start condition is established, the ECU 70 controls the rotation the crankshaft 46 by the driving force of the motor generator 3 transferred via the pulley 58, the belt 52, the pulley 50 and the electromagnetic clutch 48 to start the engine 2. Further, the ECU 70 executes an ignition timing control, and the other necessary controls.

The motor generator 3 is connected to the crankshaft 46 through the pulley 50, the pulley 58 and the belt 52. One of the crankshaft pulley 50 connected to the crankshaft 46 and the MG pulley 58 connected to the motor generator 3 is rotationally driven, whereby power is transmitted to the other via the belt 52.

The motor generator 3 has the function as the motor (electric motor) rotationally driving by receiving power supply from the power supply unit 5 which will be described later, and has the function as the generator (electric generator) for generating electromotive forces at both ends of a three-phase coil when the motor generator 3 is rotated by receiving the rotational driving force from the wheels 8. When the motor generator 3 functions as the electric motor, the motor generator 3 rotates by receiving the electric power supply from the power supply unit 5, and transmits the rotational driving force to the crankshaft pulley 50 to rotate the crankshaft 46 to start the engine 2. On the other hand, when the motor generator 3 functions as the electric generator, the rotational driving force from the wheels 8 is transmitted to the MG pulley 58 at the side of the motor generator via the crankshaft 46 and the crankshaft pulley 50 to rotate the motor generator 3. When the motor generator 3 is rotated, an electromotive force is generated in the motor generator 3, and the electromotive force is converted into a direct current via the motor control unit 4 to supply electric power to the power supply unit 5. Thus, the power supply unit 5 is charged.

Returning to FIG. 1, a motor angle sensor 3a, in which a Hall element or the like is preferably applied to a detection portion, is provided at a predetermined position in the motor generator 3. The motor angle sensor 3a can detect the rotation angle of the shaft of the motor generator 3 with high resolution of substantially 7.5° CA unit. When the motor generator 3 is rotationally driven by receiving the supply of electric power from the power supply unit 5, the motor angle sensor 3a detects the rotation angle of the shaft. Specifically, the motor angle sensor 3a is provided at each of phases U, V and W so as to be able to detect an alternating current of each of the U, V and W phases. Each of the motor angle sensors 3a detects an alternating current of each of the U, V and W phases and converts it into a pulse signal, and outputs it to the motor control unit 4.

The motor control unit 4 is provided in the engine 2, and connected to the motor generator 3 and the power supply unit 5 by the power supply cable 6, respectively. The motor control unit 4 is mainly constructed by an inverter, a converter, a controlling computer or the like.

The inverter converts a high voltage direct current from the power supply unit 5 into a predetermined three-phase alternating current to supply electric power to the motor generator 3. On the other hand, the inverter converts an electromotive force (three-phase alternating current) generated from the motor generator 3 into a direct current suitable for charging the power supply unit 5.

The converter is a DC/DC converting device for converting a predetermined DC voltage into another predetermined DC voltage. Namely, the converter drops the rated voltage (for example, 36 V voltage) of the power supply unit 5 to a predetermined voltage (for example, 12V voltage) to drive auxiliary machines and the like, or charges a 12V power supply unit loaded on the vehicle.

The controlling computer controls the inverter and the converter. Namely, the controlling computer controls the driving torque and power generation amount of the motor generator 3 in the optimal state, and controls the charge amount to the power supply unit 5 in the optimal state to perform charging. Specifically, when the motor generator 3 functions as the electric motor, the controlling computer controls the driving torque and the power generation amount of the motor generator 3 based on the electric power supplied from the power supply unit 5. As a result, the motor generator 3 is controlled in the optimal state to function as the electric motor. On the other hand, when the motor generator 3 functions as the electric generator, the controlling computer supplies a predetermined direct current to the power supply unit 5 based on the electromotive force generated from the motor generator 3 to charge the power supply unit 5.

The motor control unit 4 counts the number of pulse signals outputted from the aforementioned motor angle sensor 3a, and thereby converts the number into the rotation angle of the shaft of the motor generator 3. The motor control unit 4 converts the converted rotation angle of the shaft into the crank angle based on the rotation ratio of the crankshaft pulley 50 and the MG pulley 58. As a result, the motor control unit 4 can detect the crank angle with high resolution of substantially 3° CA unit.

The motor control unit 4 can detect whether the shaft of the motor generator 3 rotates in the normal or in the reverse direction. Namely, the output state of the pulse signal of each of the phases U, V and W differs when the shaft of the motor generator 3 rotates in the normal direction and in the reverse direction. The pulse signal of each of the phases U, V and W when the shaft of the motor generator 3 rotates in the normal direction is in such an output state according to the phase difference as the pulse signal of the U phase is firstly outputted for a predetermined time, thereafter, the pulse signal of the V phase is outputted for a predetermined time later, thereafter, the pulse signal of the W phase is outputted for a predetermined time later, and they are repeated periodically. In contrast, the pulse signal of each of the phases U, V and W when the shaft of the motor generator 3 rotates in the reverse direction is in such an output state as the pulse signal opposite to that of the normal rotation. Namely, when the shaft of the motor generator 3 rotates in the reverse direction, each of the pulse signals for the predetermined time is periodically repeated in the order of the W phase, V phase and U phase. For this reason, the motor control unit 4 can detect whether the shaft of the motor generator 3 rotates in the normal or the reverse direction, based on the phase difference between them.

The power supply unit 5 is a secondary battery such as a lead battery or a nickel hydrogen battery. The power supply unit 5 is placed at, for example, a rear part of the vehicle 10 to increase space efficiency of the vehicle 10. The power supply unit 5 may have a rated voltage of 36V, for example. The power supply unit 5 has high input-output characteristics at the time of actuation of the motor generator 3 or in energy regeneration during braking the vehicle. Specifically, the power supply unit 5 supplies electric power to the auxiliary machines, the motor generator 3 and the like. Electric power supply to the motor generator 3 is mainly performed while the vehicle 10 is stopped. When the vehicle 10 is running or braking, the electromotive force generated from the motor generator 3 is converted into a direct current via the motor control unit 4 and supplied to the power supply unit 5. As a result, the power supply unit 5 can be charged.

The power supply cable 6 is connected between the motor generator 3 and the motor control unit 4, and also between the motor control unit 4 and the power supply unit 5 as described above, and plays the part of passing the direct current and the three-phase alternating current.

The power transmission system 7 is mainly constructed by the torque converter, a lock-up clutch, a transmission, a power switching mechanism and the like. As a result of their cooperation, the power transmission system 7 transmits or shuts off the rotational driving force generated from the engine 2 or the motor generator 3 to or from the wheels 8 in accordance with the running state. Also, the power transmission system 7 transmits the rotational driving force from the wheels 8 to the motor generator 3 at the time of braking and the like.

The wheel 8 includes tires and the like for transmitting the rotational driving force from the power transmission system 7 to a road surface. In this embodiment, rear wheels are shown as the wheels 8.

Next, examples of the crank angle sensor 90 and the cam angle sensor 92 will be explained.

Figure 3:
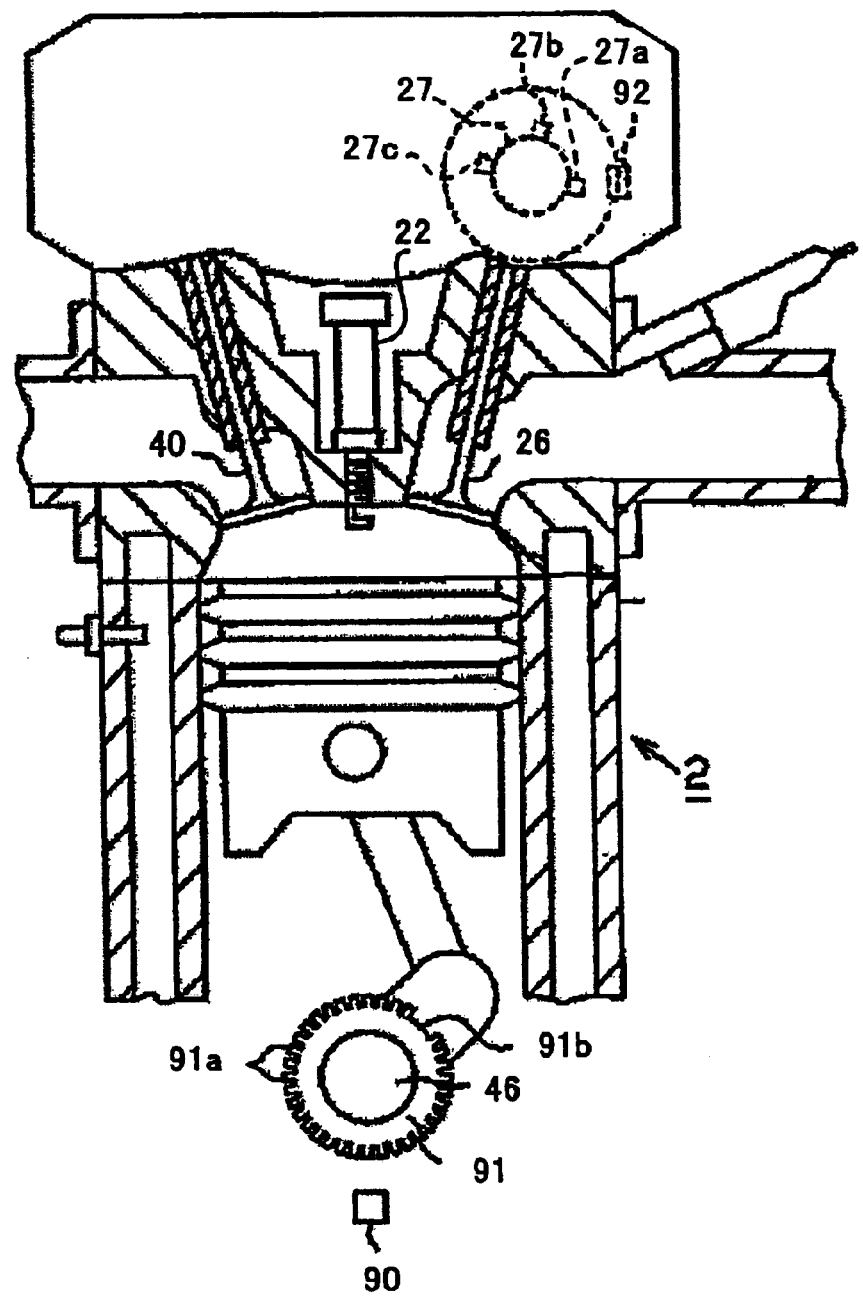
FIG. 3 is a view showing a configuration of a crank angle sensor and a cam angle sensor.

As shown in FIG. 3, a signal rotor 91 (omitted in FIG. 2) is attached to the crankshaft 46. On the outer circumferential portion of the signal rotor 91, 34 teeth (projection portions) 91a formed at equal angles (here, spaced by 10°) with an axis of the crankshaft 46 as a center and a wide lacked tooth (portion with no teeth existing) 91b are provided. The length of the lacked tooth portion 91b corresponds to that of two teeth 91a. The crank angle sensor 90 is provided to oppose the outer circumferential portion of the signal rotor 91.

When the crankshaft 46 is rotated, the teeth 91a and the lacked tooth 91b of the signal rotor 91 pass near the crank angle sensor 90 in sequence, whereby a rotation signal of pulse form (hereinafter, called "NE signal") including pulses corresponding to the number of passages of the teeth 91a and the lacked tooth 91b is outputted from the crank angle sensor 90.

On the other hand, three projections 27a, 27b and 27c are provided on the outer circumferential surface of the intake camshaft 27 to be arranged at spaces of 90° (corresponding to 180° CA) with an axis of the intake camshaft 27 as a center. Accordingly, a space between the projection 27a and the projection 27c at both ends is 180° (corresponding to 360° CA). The cam angle sensor 92 for detecting the projections 27a to 27c and outputting the detection signals is provided to oppose these projections 27a to 27c. When the intake camshaft 27 is rotated, the projections 27a to 27c pass near the cam angle sensor 92. As a result, a detection signal in a pulse form is outputted from the cam angle sensor 92 corresponding to each passage of the projections 27a to 27c.

Figure 4A:
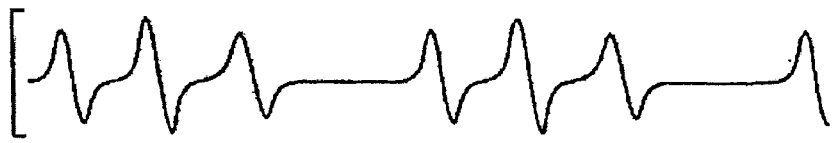
FIGS. 4A, 4B, 4C and 4D show output signal waveforms of a crank angle sensor and a cam angle sensor.
Figure 4B:
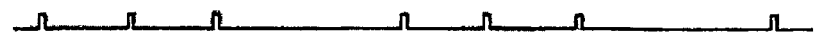
Figure 4C:
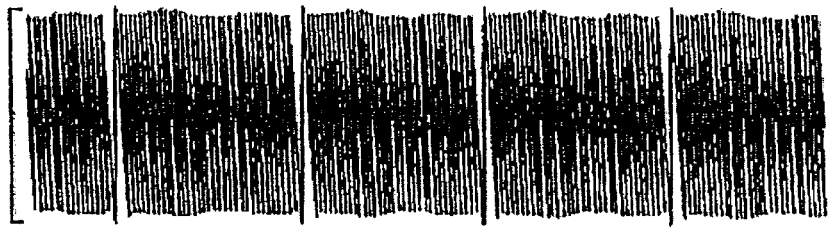
Figure 4D:
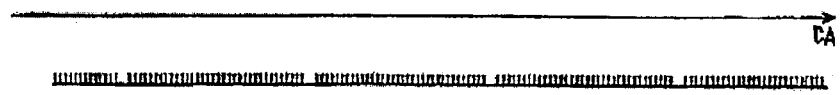

Here, the signals obtained from the crank angle sensor 90 and the cam angle sensor 92, which are inputted into the ECU 70 when the engine 2 is driven, are shown in FIGS. 4A, 4B, 4C and 4D. FIG. 4A shows a voltage waveform generated in the cam angle sensor 92 according to the rotation of the intake camshaft 27. FIG. 4B is the waveform obtained by converting the voltage waveform of FIG. 4A into the cam angle signal (G2 signal) in the pulse form. FIG. 4C shows a voltage waveform generated in the crank angle sensor 90 according to the rotation of the crankshaft 46. FIG. 4D is the voltage waveform obtained by converting the waveform of FIG. 4C into the NE signal. In this example, in the NE signal, the number of pulses corresponding to the teeth 91a is 34 per one rotation (360° CA) of the crankshaft 46. Among the rotation signals outputted from the crank angle sensor 90, in the portion corresponding to the lacked tooth 91b, the space between the pulses is made wide due to the absence of 2 pulses. The number of the portions with the wide pulse space is one per one rotation (360° CA) of the crankshaft 46.

The ECU 70 detects rotation phases of the crankshaft 46 and the intake camshaft 27 based on the NE signal from the crank angle sensor 90 and the cam angle signal from the cam angle sensor 92. The ECU 70 performs cylinder discrimination for each cylinder (#1 to #4) based on the rotation phases of the crankshaft 46 and the intake camshaft 27, and selects the cylinder for which the fuel injection and the ignition should be performed from among the cylinders (#1 to #4).

[Operation of Vehicle]

Next, an operation of the vehicle 10 constituted as described above will be explained. The vehicle 10 performs various kinds of operations in accordance with various operation states such as stop, start, normal running, accelerative running, braking or the like.

The engine 2 is in a stopped state during automatic stop (idling stop) of the vehicle 10. When driving of auxiliary machines such as an air compressor, a water pump, a power steering pump or the like is necessary in this state, the motor generator 3 receives the electric power supply from the power supply unit 5 and drives these auxiliary machines without driving the engine 2. However, the engine 2 and the motor generator 3 are rotatably connected with each other via the V belt and the respective pulleys. Therefore, when the shaft of the motor generator 3 is rotated, the rotational driving force is transmitted to the engine 2 in this state. Consequently, in order to drive only the above-described auxiliary machines, the electromagnetic clutch is operated to shut off the rotational driving force from the motor generator 3 so that the crankshaft of the engine 2 is not rotated. This enables to drive only the auxiliary machines without driving the engine 2.

At the time of starting the vehicle 10, namely, when a driver takes his or her foot off the brake pedal while the vehicle is in the idling stop state, the motor generator 3 raises the number of revolution to the vicinity of the number of idling revolution. Then, when the driver stamps or depresses the accelerator pedal, the motor generator 3 rotates the crankshaft of the engine 2 and automatically restarts the engine 2. When a predetermined time elapses from the brake off operation, namely, from the time when the driver takes his or her foot off the brake pedal, the engine 2 may also be automatically restarted to obtain optimal power performance.

At the time of normal running, the vehicle 10 runs by the driving force from the engine 2, which is transmitted to the wheels 8 as in the ordinary vehicles. During normal traveling, if the voltage of the power supply unit 5 is low, the driving force from the wheels 8 is transmitted to the motor generator 3 and the motor generator 3 performs electric power generation. As a result, the motor generator 3 functions as an electric generator, and charges the power supply unit 5 to replenish insufficient electric power of the power supply unit 5 (hereinafter, this operation state will be called "regeneration"). Thereby, the power supply unit 5 is always kept in a proper charged state.

When the vehicle 10 performs uphill running and accelerative running, the motor generator 3 is driven by using the electric power of the power supply unit 5 in addition to the state during the aforementioned normal running, in order to provide proper power performance, and the rotational driving force by the motor generator 3 may be given to the rotational driving force of the engine 2 (hereinafter, this operation state will be called "assist"). This allows the vehicle 10 to obtain high power performance with effective use of the two power sources, i.e., the engine 2 and the motor generator 3.

At the time of braking in deceleration and the like, the driving force by the wheels 8 is transmitted to the motor generator 3 via the power transmission system 7 and the engine 2, and the regeneration is performed.

[Engine Stop Control]

Next, an engine stop control of the vehicle 10 will be explained. As described above, the vehicle 10 performs idling stop, namely, automatically stops the engine 2 at the time the vehicle 10 stops. Thereafter, when the driver takes his or her foot off the brake pedal, the motor generator 3 raises its revolution close to the number of idling revolution of the engine 2. Then, when the driver stamps or depresses the accelerator pedal, the motor generator 3 is rotationally driven, and the rotational driving force automatically restarts the engine 2. In this situation, in order to smoothly start running the vehicle 10 at the time of automatic start of the engine 2, the crank angle is controlled to stop at the optimal crank angle stop position inside the engine 2 at the time of idling stop. In the following example, accurate stop control is performed by effectively utilizing inertia energy of the engine 2 at the time of stopping the vehicle.

A method for controlling the crank angle to the optimal crank angle stop position will be described hereinafter. The optimal crank angle stop position is assumed to be a stop position of the crank angle, which makes it easy to get over the top dead center of the compression stroke at the time of restarting the engine 2 in the cylinder at the compression stroke. For example, in the case of the four-cylinder engine as in this example, the crank angle stop position is optimal if it is within a range of the crank angle of 90° CA to 120° CA.

In summary, in the ordinary stop control method of the vehicle 10, the ECU 70 executes fuel cut to the engine 2 at a predetermined timing from the idling state, and automatically stops the engine 2 by the inertia energy which the engine 2 has thereafter. However, the inertia energy which the engine 2 has varies each time according to the number of engine revolution at the time of the fuel cut, and the crank angle stop position differs each time accordingly. For this reason, with the ordinary stop control method of the vehicle 10, it is difficult to control the crank angle to stop at the optimal crank angle stop position, and the next engine start load becomes large depending on the crank angle stop position when the vehicle actually stops. Consequently, in relation with the output torque which the motor generator 3 has, the crankshaft of the engine 2 cannot be rotated, and the probability of failure of automatic restart of the engine 2 becomes high.

Consequently, in this example, the number of engine revolution is kept constant at a predetermined timing after the fuel cut, whereby the inertia energy which the engine 2 has is made constant at that point of time. Thereafter, the inertia energy which the engine 2 has at that point of time is utilized to stop the rotation of the engine 2. By this, the crank angle can be reliably controlled to stop at the optimal crank angle stop position every time.

Especially, in this embodiment, the motor generator 3 is used to make the number of engine revolution constant. Namely, a rotational driving force from the motor generator 3 is given to the crankshaft at a predetermined timing after the fuel cut (hereinafter, called "motoring"), whereby the inertia energy which the engine 2 has is made constant. Thus, the crank angle at the time of stopping the engine is controlled to stop at the optimal crank angle stop position. When the crank angle is at the optimal crank angle stop position, the engine start load at the time of starting the engine can be minimized, and the failure of automatic restart of the engine 2 can be effectively prevented.

Figure 5:
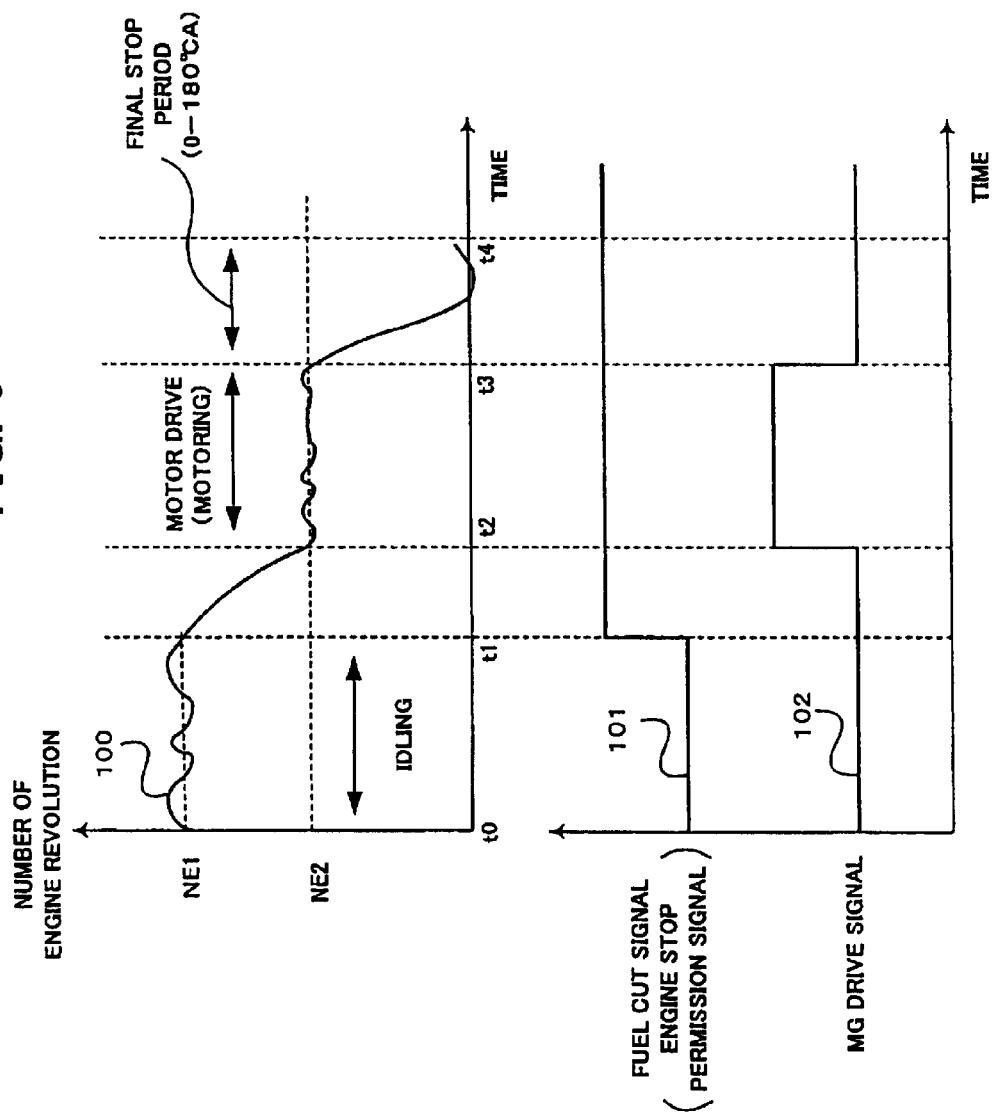
FIG. 5 is a graph showing a transition of a number of engine revolution by an engine stop control.

The manner of controlling the number of engine revolution at the time of stopping the engine with use of the motor generator 3 is shown in FIG. 5. In FIG. 5, the waveform 100 represents the variation of number of engine revolution according to the engine stop control of this embodiment. The waveform 101 represents a fuel cut signal in the engine stop control, and the fuel cut is executed when the fuel cut signal is at an H-level. The waveform 102 represents a drive signal (MG drive signal) of the motor generator 3, and the motor generator 3 is driven during the period in which the MG drive signal is at the H-level.

If it is assumed that the driver takes his or her foot off the accelerator pedal at time t0, the number of revolution of the engine 2 after time t0 substantially becomes the number of idling revolution NE1. If it is assumed that the driver depresses the brake pedal at time t1, the ECU 70 sets the fuel cut signal to H-level at this point of time, and gives an instruction of the fuel cut. When the fuel cut is executed at time t1, the number of revolution of the engine 2 gradually decreases. When the ECU 70 detects that the number of engine revolution decreases down to a predetermined motor setting number of revolution NE2 (time t2), the ECU 70 sets the MG driving signal to the H-level, drives the motor generator 3, and drives the engine 2 by the motor generator 3.

The motor generator 3 drives the engine 2 at the predetermined motor setting number of revolution NE2 for a predetermined period (time t2 to t3), and when the predetermined period elapses, the ECU 70 stops the motor generator 3 (time t3). When the driving force by the motor generator 3 is removed at time t3, the engine 2 is rotated only by the inertia energy which the engine 2 has at that point of time (i.e., time t3), and therefore the number of engine revolution gradually decreases, and the engine 2 stops in the vicinity of time t4.

In this manner, in the present embodiment, the driving of the engine 2 is temporarily switched to the driving by the motor generator 3 at the time of stopping the engine, and after the engine 2 is kept at the predetermined number of revolution NE2, the driving force of the engine is removed. The inertia energy, which the engine 2 has at the point of time when the driving force is removed, is mainly determined by the number of engine revolution at that point of time. Therefore, by removing the driving force after the number of engine revolution is kept at the predetermined number of engine revolution NE2, the engine 2 has the same inertia energy each time, and stops in the same manner.

Figure 6:
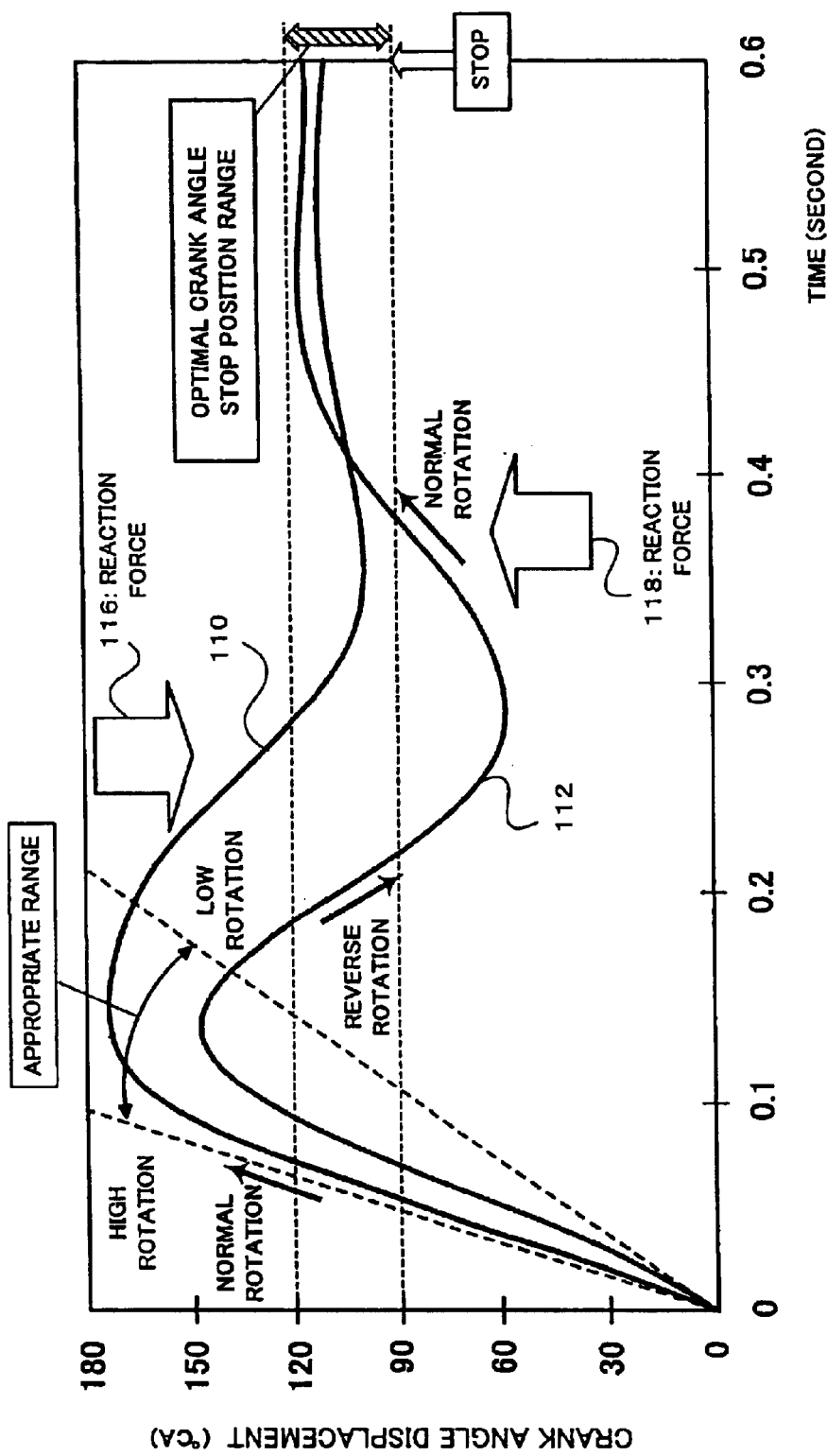
FIG. 6 is a graph showing a state of a change of a crank angle position by an engine stop control.

Next, a behavior of the engine until the engine stops after the driving force is removed at the predetermined number of engine revolution NE2 as described above will be explained. FIG. 6 shows the displacement of the crank angle of the engine 2 after the driving force for the engine 2 is removed. In FIG. 6, the vertical axis shows the displacement of the crank angle (° CA) of a predetermined cylinder. It is noted that the "predetermined cylinder" is the cylinder which is in the compression stroke when the crank angle is displaced from 0° CA to 180° CA, for example, the #3 cylinder. The horizontal axis shows time (second).

Specifically, the vertical axis shows the crank angle displacement (° CA) when the piston corresponding to the predetermined cylinder shifts from the compression stroke to the expansion stroke, and shows the crank angle displacement at every 30° CA from the bottom dead center (0° CA) to the top dead center (180° CA). Meanwhile, the horizontal axis shows the lapse of time (0.6 (second)) from the motoring stopping time (0 (second)) until the crank angle of the predetermined cylinder is controlled to stop at the optimal crank angle stop position at every 0.1 (second).

Next, the graphs in FIG. 6 will be explained. In FIG. 6, two kinds of graphs are shown. They are a graph 110 for the case in which the number of engine revolution at the time of stopping driving (motoring) by the motor generator 3 is high and a graph 112 for the case in which it is low. Namely, during the time from 0 second to 0.1 seconds, the graph 110 with a large gradient shows the crank angle displacement when the number of engine revolution at the time of stopping motoring is high, and the graph 112 with a small gradient shows the crank angle displacement when the number of engine revolution at the time of stopping motoring is low.

First, from 0 second to the vicinity of 0.1 second, it is shown that the piston corresponding to the predetermined cylinder rises from the bottom dead center to the top dead center in the compression stroke. The piston corresponding to the predetermined cylinder rises to the vicinity of the top dead center of the compression stroke just after 0.1 second elapses. At this time, the crankshaft 46 of the engine 2 is rotating in the normal direction.

Thereafter, the piston corresponding to the predetermined cylinder cannot get over the top dead center (180° CA) of the compression stroke, and the crankshaft of the engine 2 is rotated in the reverse direction until it is near 0.3 second. This is for the following reason. As a result that the piston corresponding to the predetermined cylinder approaches the top dead center of the compression stroke, the volumetric capacity in the cylinder gradually becomes smaller, and the pressure becomes higher. In proportion to this, the compression reaction force 116 to push back the piston becomes larger in the cylinder. Accordingly, in the vicinity of the top dead center of the compression stroke, the compression reaction force is the largest in the cylinder, and therefore the inertia energy which the engine has at that point of time cannot beat the compression reaction force. Thus, the piston corresponding to the predetermined cylinder is pushed back to the side of the bottom dead center of the compression stroke. Thus, the piston corresponding to the predetermined cylinder cannot get over the top dead center of the compression stroke, and the crankshaft of the engine 2 is rotated in the reverse direction.

Thereafter, the piston corresponding to the predetermined cylinder moves to the bottom dead center of the compression stroke, and the crankshaft 46 of the engine 2 is rotated in reverse again in the vicinity of 0.3 second. Namely, the crankshaft of the engine 2 is rotated in the normal direction. This is for the following reason. Namely, at this time, the piston corresponding to the predetermined cylinder firstly descends to the bottom dead center of the compression stroke. In the compression stroke, the intake and exhaust valves are both in the closed state, and therefore the volumetric capacity inside the cylinder becomes gradually larger as the piton descends to the bottom dead center of the compression stroke. Consequently, negative pressure is formed inside the cylinder, and the negative pressure becomes gradually larger. Accordingly, the piston corresponding to the predetermined cylinder is returned in the direction of the top dead center again by a reaction force 118 caused by the negative pressure. As a result, the crankshaft of the engine 2 is rotated in the normal direction again.

Thereafter, the inertia energy which the engine 2 has gradually decreases from the vicinity of 0.3 second, and the engine 2 stops after 0.6 second elapses. As a result, the crank angle stop position converges within a range of the crank angle of 90° CA to 120° CA. If the crank angle stop position ultimately converges within the range of the crank angle of about 90° CA to 120° CA, it is considered that the crank angle is controlled to stop at the optimal crank angle stop position, and the stop control is successful.

[Engine Stop Position Estimating Processing]

Figure 7:
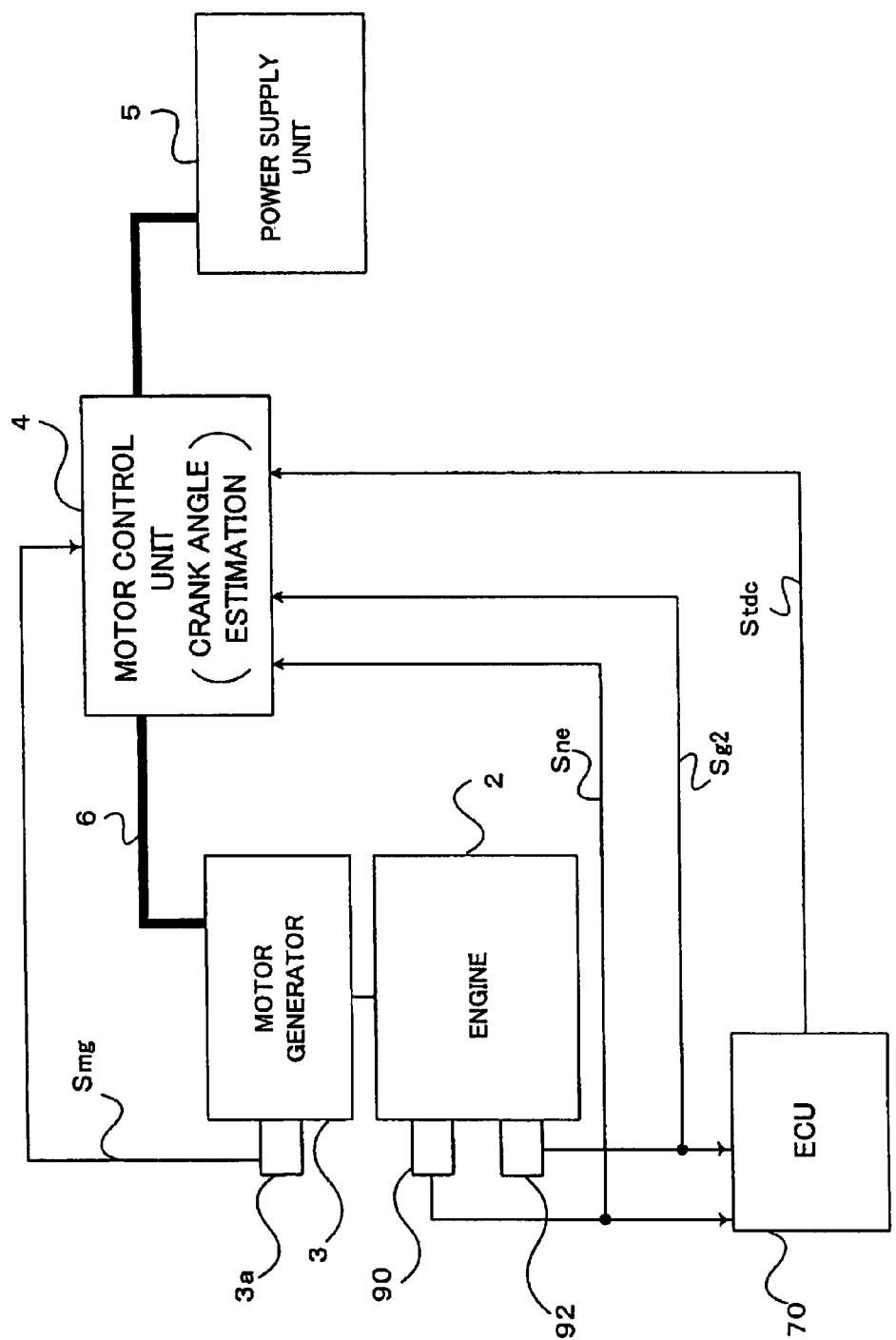
FIG. 7 is a block diagram showing a configuration example of the engine stop position estimating apparatus according to an embodiment of the present invention.

Next, engine stop position estimating processing will be explained. FIG. 7 shows a schematic configuration of an engine stop position estimating apparatus according to the present invention. In this example, a motor control unit 4 executes the engine stop position estimating processing. Specifically, the motor control unit 4 estimates the engine stop position, namely, the crank angle at the time of stopping the engine based on the MG position signal Smg outputted from the motor angle sensor 3a, the NE signal Sne outputted from the crank angle sensor 90, the cam angle signal (G2 signal) Sg2 outputted from the cam angle sensor 92 and the TDC signal Stdc generated in the ECU 70. The TDC signal includes two signals (a TDC 1 signal and a TDC 2 signal) which will be described later.

FIG. 8 is a table in which the characteristics of the MG position signal, the NE signal, the G2 signal and the TDC signal described above are organized.

The MG position signal is the signal which is outputted from the motor angle sensor 3a of the motor generator 3 and indicates the rotation angle of the motor shaft. The shaft of the motor generator 3 is connected to the MG pulley 58 as shown in FIG. 2, and is interlocked by the belt 52 with the crankshaft pulley 50 connected to the crankshaft 46. While the MG position signal cannot indicate an absolute angle of the crankshaft because there exists a slip amount of the belt connecting the MG pulley 58 and the crankshaft pulley 50, the MG position signal can indicate a relative angle of the crankshaft. According to the MG position signal, the crank angle can be detected with resolution of about 3° CA, although the resolution depends on a pulley ratio of the MG pulley 58 and the crankshaft pulley 50. Also, since it can be discriminated from the MG position signal whether the motor is rotated in the normal direction or the reverse direction as described above, a reverse rotation signal indicating whether the motor is rotated in the normal direction or the reverse direction can be generated.

The NE signal is a detection signal of the teeth 91a of the signal rotor 91 attached to the crankshaft 46 as described above, with which the absolute crank angle can be detected with resolution of about 10° CA to 30° CA in accordance with the number of teeth 91a provided at the signal rotor 91.

The cam angle signal (G2) is mainly utilized as a cylinder discrimination signal as described above. Since the camshaft and the crankshaft are connected with each other by a timing belt, a timing chain and the like, the G2 signal is basically the signal corresponding to the absolute crank angle. However, in the case of the engine employing a variable valve mechanism (VVT), the G2 signal includes the timing shift.

The TDC signal is the signal which the ECU 70 or the like generates based on the NE signal outputted by the crank angle sensor 90, and the TDC signal indicates the time cycle of the TDC. Consequently, 360° CA of the absolute crank angle can be detected with the TDC signal.

When an MPU sensor is used as the crank angle sensor 90 and the cam angle sensor 92, the sensor output cannot be obtained while the number of engine revolution (crankshaft revolution) is low. However, in the case of using an MRE sensor, the sensor output can be obtained even when the number of engine revolution (crankshaft revolution) is low, and hence each signal can be obtained.

Next, the crank angle estimating processing will be explained. The crank angle estimating processing described below performs crank angle estimation with high accuracy by combining the outputs of the motor angle sensor at the side of the motor generator and the crank angle sensor and the cam angle sensor at the side of the engine.

As shown in Table in FIG. 8, it is the MG position signal that can detect the crank angle with the highest accuracy. However, the absolute crank angle cannot be obtained from the MG position signal. Consequently, the crank angle is calculated by the MG position signal having the highest accuracy, and correction is performed by using the TDC signal or the NE signal which shows the absolute crank position, whereby the crank angle is estimated with high accuracy.

Figure 9:
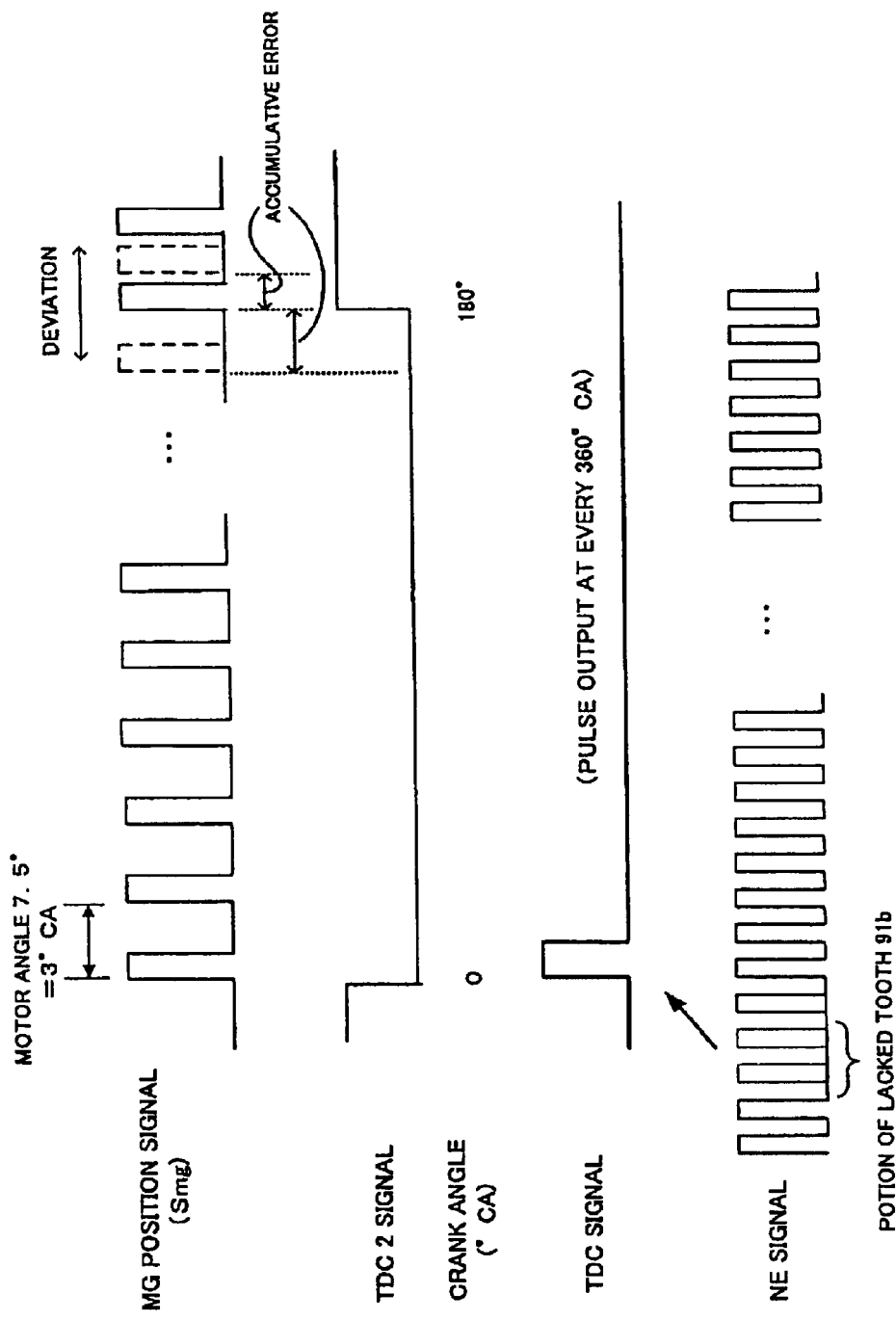
FIG. 9 is a diagram explaining a crank angle estimating method.

FIG. 9 shows the concrete example. With the MG position signal, the crank angle can be detected with the resolution of 3° CA as described above. Accordingly, the crank angle is basically calculated based on the MG position signal. on this occasion, the crank angle is calculated in consideration of the rotation direction of the engine, by utilizing the reverse rotation signal.

Meanwhile, the NE signal is the signal obtained by detecting the teeth 91a of the signal rotor 91 attached to the crankshaft 46, and pulse output does not exist at the portion of the lacked tooth 91b (corresponding to two pulses in this example). The portion of the lacked tooth 91b corresponds to the position just before the top dead center (TDC) in a specific cylinder of the engine 2. Therefore, as shown in FIG. 9, the top dead center of the cylinder is located just after the portion of the NE signal corresponding to the lacked tooth. Consequently, the ECU 70 generates the TDC signal shown in FIG. 9, namely, the signal outputting the pulse corresponding to the top dead center in the cylinder at every 360° CA, based on the NE signal. Further, the ECU 70 divides the TDC signal to generate a signal whose level changes at every 180° CA (a TDC2 signal in FIG. 9). The TDC signal and the TDC2 signal indicate the absolute crank angle. Consequently, the crank angle signal obtained based on the MG position signal with high resolution is corrected based on the TDC signal or the TDC2 signal. Thus, the absolute crank angle with high accuracy can be obtained.

Specifically, the timing of 180° CA of the crank angle obtained based on the MG position signal (hereinafter, called "MG estimate crank angle") and the timing of 180° CA which the TDC2 signal indicates are compared, as shown in FIG. 9. Since the MG position signal includes an accumulative error due to the slip of the belt connecting the MG pulley and the crankshaft pulley, and the error amount is corrected based on the TDC 2 signal. Namely, the crank angle estimation is performed in the high accuracy unit (3° CA in this example) based on the MG position signal, and the MG estimate crank angle thus obtained is corrected at every 180° CA based on the TDC2 signal which gives the absolute crank angle. In practice, it is suitable to count up the MG estimate crank angle based on the MG position signal and reset the MG estimate crank angle at every 180° CA based on the TDC2 signal.

The above-described method of generating the TDC2 signal to perform the correction at every 180° CA is only an example. Any method can be adopted, which corrects the MG estimate crank angle signal by utilizing the signal based on the NE signal or the TDC signal indicating the absolute crank angle. For example, a signal which changes in the level at every 90° CA may be generated based on the TDC signal, and the MG estimate crank angle signal may be corrected at every 90° CA by using this signal. The MG estimate crank angle signal may be corrected at every 30° CA by using the NE signal itself having the accuracy of 30° CA. Alternatively, the MG estimate crank angle may be corrected at every 720° CA by using the G2 signal. Since the G2 signal is the cylinder discrimination signal, the MG estimate crank angle can be corrected and the cylinder discrimination can be performed at the same time, by using the G2 signal, thereby to recognize the stroke of each cylinder at the time of stopping the engine.

Since the MG position sensor can detect the motor rotation angle at the time when the number of engine revolution is low (see FIG. 8), it becomes possible to estimate the crank angle accurately from the time of low engine revolution to the stop of the engine, irrespective of whether the MPU sensor or the MRE sensor is used for the crank angle sensor and the cam angle sensor.

The above-described crank angle estimating processing is to generate a state signal indicating whether the crank angle estimating processing is performed stably or not, namely, whether the accuracy of the crank angle estimation is sufficient or not based on the error at the time of correcting the MG estimate crank angle.

As for the errors included in the MG estimate crank angle, an error caused by the slip of the belt 52 connecting the MG pulley 58 and the crankshaft pulley 50, and an arithmetic operation error when the MG estimate crank angle is calculated based on the MG position signal are basically conceivable. However, it is considered that the error due to the slip of the belt stays within a certain range in accordance with the structure of the belt and the pulley portions, and that the arithmetic operation error of the MG estimate crank angle also stays within a certain range.

While the crank angle estimating processing is stably executed with high accuracy, the error between the MG estimate crank angle and the absolute crank angle obtained based on the TDC signal or the like stays within the aforementioned standard error range. Conversely, when the error does not stay within the standard error range, it can be considered that the crank angle estimating processing is in an unstable state, namely, in a state in which the estimate accuracy is not sufficient and the estimated result is not reliable due to some factor. Therefore, the motor control unit 4 sets a state flag such as an estimation accuracy flag. When the error is within the standard error range, the estimation accuracy flag is set to be ON (indicating the state in which the estimation accuracy is ensured), and when the error is outside the standard error range, the estimation accuracy flag is set to be OFF (indicating the state in which the estimation accuracy is insufficient). Consequently, it can be known more easily by referring to the estimation accuracy flag whether the estimated result of the crank angle estimating processing executed during stop position control is reliable or not. Based on the estimation accuracy flag, various countermeasures can be taken. For example, when the estimation accuracy flag is OFF during engine stop control such as idling stop, the engine stop position estimation result at this time is determined to be unreliable and the engine stop control may be discontinued. Also, when the estimation accuracy flag is OFF, predetermined processing may be executed when starting the engine next time.

[Start Control Method]

Next, the description will be given of various kinds of start control methods in accordance with the crank angle stop position, which is the central part of the present invention.

If the crank angle is controlled to stop at the optimal crank angle stop position, there is no problem because the probability that the automatic restart is succeeded by the motor generator 3 is high. On the other hand, when the crank angle cannot be controlled to stop at the optimal crank angle stop position in the idling stop in some reasons, a proper control is needed at the time of starting the engine, because the automatic restart may fail. In the present invention, when the probability that the engine does not stop at the optimal crank angle stop position by the engine stop control is high, the proper start control is executed in accordance with the situation. The causes that the stop control cannot be executed at the optimal crank angle stop position may be mainly that the problem happens to the stop control method by the noise, etc., or that the problems happen to the motor angle sensor 3a and the crank angle sensor 90.

(1st Embodiment)

First, the first embodiment will be explained. The first embodiment relates to the start control in which the crank angle is detected by utilizing the output of the crank angle sensor 90 after the engine stop control.

When the crank angle is not at the predetermined optimal crank angle stop position, e.g., the crank angle is not within a range of the crank angle of 90° CA to 120° CA, even though the stop control of the vehicle 10 is executed in the idling stop, the engine starting load becomes large at the time of restarting the engine 2. Therefore, if the automatic engine restart is executed by the motor generator 3 at that time, the automatic engine restart may fail due to the shortage of the output torque by the motor generator 3. Thus, in the embodiment, it is detected, by utilizing the crank angle sensor 90, whether or not the engine is successfully stopped at the optimal crank angle stop position by the engine stop control. In the case of failure, the ECU 70 executes the start of the engine 2 by the DC starter 1 of the large output torque, not by the motor generator 3.

When the stop control to the optimal crank angle stop position fails, the engine starting load for the automatic restart of the engine 2 becomes quite large. In concrete, when the stop control fails, as the piston in the compression stroke at the time of the automatic engine restart approaches the top dead center of the compression stroke, the piston receives large compression reaction force. Due to that, at the time of the automatic restart, the engine starting load is generated so that the piston can overcome the compression reaction force to get over the top dead center of the compression stroke. Therefore, in relation with the output torque of the motor generator 3, the motor generator 3 cannot output the torque sufficient to start the engine 2 by rotating the crank shaft, and the probability that the automatic engine restart fails becomes high.

When the stop control to the optimal crank angle stop position fails, the ECU 70 does not executes the automatic engine restart by the motor generator 3. Instead, the ECU 70 starts the engine 2 by the DC starter 1 having larger output torque. Thereby, even when the stop control to the optimal crank angle stop position fails, the engine 2 is surely restarted, and the engine restart time from the idling stop state can be short. Thus, without deteriorating the drivability, the demand of the driver to start the engine can be appropriately achieved.

Figure 10:
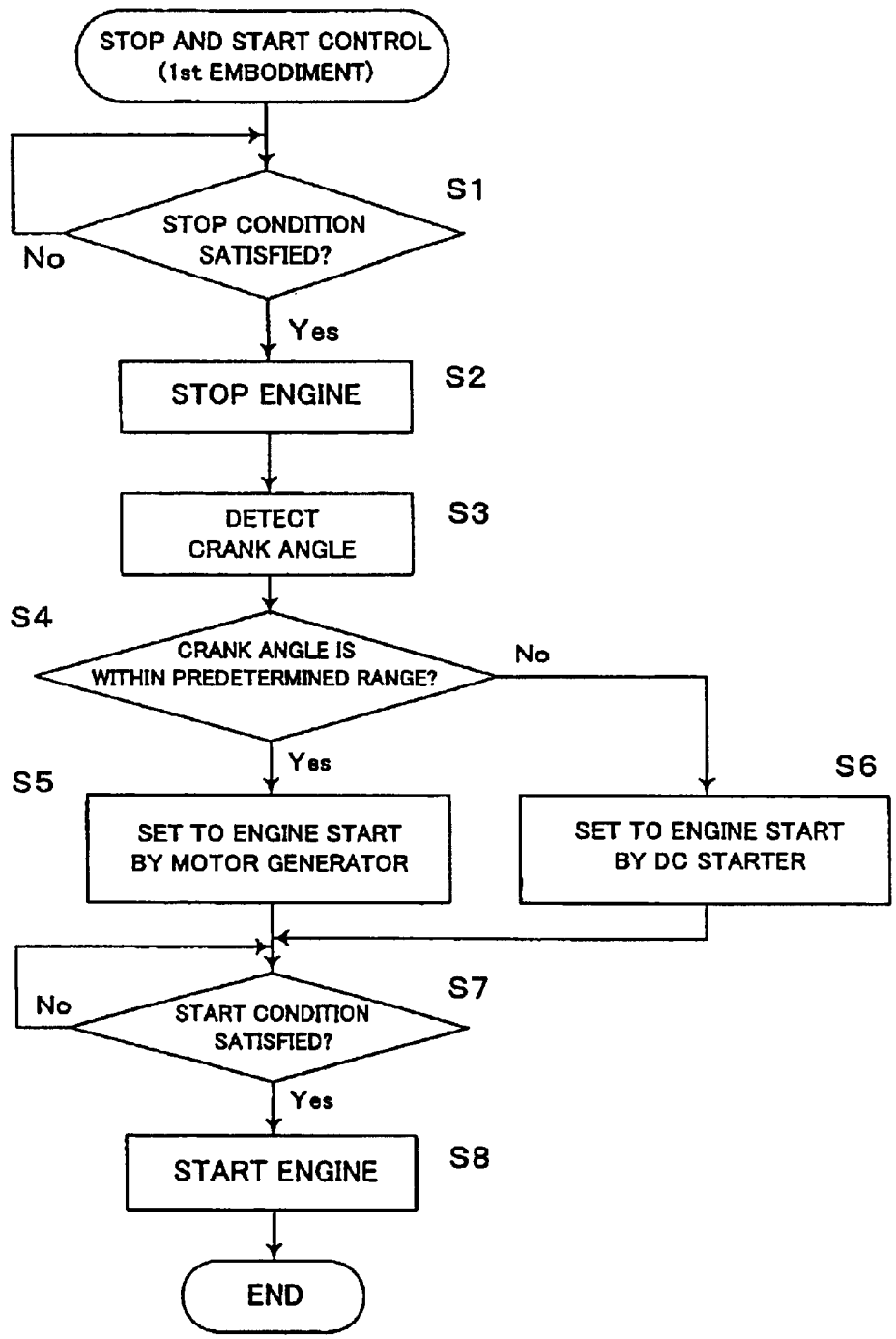
FIG. 10 shows a flow chart of an engine stop and start control according to the first embodiment.

Next, the flow of the engine stop and start control of the first embodiment will be explained with reference to FIG. 10. FIG. 10 is a flow chart showing the stop and start control method according to the embodiment. It is noted that the ECU 70 executes the stop and start control, basically based on the output signals from the various kinds of the sensors.

First, in step S1, the ECU 70 determines whether or not the engine stop condition is satisfied, e.g., whether or not the brake switch is ON/OFF, and whether or not the number of engine revolution is equal to the predetermined number of engine revolution. In concrete, when the brake switch 78 interlocking with the brake pedal is ON (namely, the condition that the driver is braking the vehicle), and the number of engine revolution is equal to the predetermined number of engine revolution (for example, it is close to 0 (rpm)), the ECU 70 determines that the engine stop condition is satisfied, based on the output signals from the sensors which detect each those states (step S1; Yes). On the other hand, when the brake switch is OFF, or when the number of engine revolution is not equal to the predetermined number of engine revolution (for example, it is close to 0 (rpm)), the ECU 70 determines that the engine stop condition is not satisfied.

Next, in step S2, the ECU 70 stops the engine 2 by the engine stop control. The crank angle is controlled by the engine stop control to be at the optimal crank angle stop position. Namely, as described above, a fuel injection cut is executed to each cylinder in the idling state, and the motoring is executed at the predetermined timing. As a result, the inertia energy of the engine 2 is kept constant, and the number of engine revolution finally becomes 0 (rpm) to stop the engine 2 (step S2).

Next, in step S3, the detection of the crank angle stop position after stopping the engine is executed. In concrete, the motor control unit 4 executes the detection of the crank angle by using the crank angle sensor 90 capable of detecting the absolute crank angle, in response to a command signal from the ECU 70 (step S3). By this, the crank angle after the stop control is detected.

Next, in step S4, the ECU 70 receives the output signal from the motor control unit 4, and determines whether or not the crank angle detected in step S3 is within the predetermined range, i.e., whether or not the vehicle is controlled to stop at the optimal crank angle stop position.

Next, the ECU 70 determines whether the engine is started by the motor generator 3 or by the DC starter 1, in accordance with the state of the crank angle stop position. When the crank angle is at the optimal crank angle stop position, the engine starting load for restarting the engine 2 becomes small. Therefore, since the engine 2 can be appropriately restarted by the output torque from the motor generator 3, the ECU 70 sets the next start method of the engine 2 to the engine start by the motor generator 3 (step S5).

On the other hand, when the crank angle is not at the optimal crank angle stop position, the engine starting load for restarting the engine 2 becomes large. Therefore, the ECU 70 sets the next start method of the engine 2 to the engine start by the DC starter 1 having the output torque larger than that of the motor generator 3 (step S6).

Next, in step S7, the ECU 70 determines whether or not the engine start condition is satisfied, based on whether or not the brake switch is turned from ON to OFF. In concrete, when the brake switch 78 interlocking with the brake pedal is turned from ON to OFF, i.e., when the driver takes his or her foot off the brake pedal, the ECU 70 determines that the engine start condition is satisfied based on the output signal from the sensor detecting the state (step S7; Yes). By this, the ECU 70 starts the engine 2 by the engine start method which is set in step S5 or S6 (step S8).

On the other hand, when the brake switch is still ON, the ECU 70 determines that the engine start condition is not satisfied based on the output signals from the sensors detecting the state (step S7; No), and does not start the engine 2 until the engine start is permitted.

As explained above, the ECU 70 detects the absolute crank angle after the stop control by the crank angle sensor, and selects the optimal engine starting method according to the state. Therefore, the next engine restart can be promptly and reliably executed.

When the idling stop is performed several times and the stop control to the optimal crank angle stop position fails continuously for predetermined times, the ECU 70 can inhibit the idling stop afterward by determining that a certain problem happens to the stop control function of the engine. When the stop control to the optimal crank angle stop position fails, as explained above, the engine starting method is changed to the engine start control method by the DC starter 1 each time, which brings about the deterioration of the drivability during the automatic engine start. Since the DC starter 1 is utilized many times for the engine restart, problems may also happen to durability (useful life) of the DC starter 1.

In the DC starter 1, the large current, for example, 600 to 800 A (ampere), flows in the engine start. Due to this, if the engine restart by the DC starter 1 is often repeated, a contact point (brush) which supplies the power to the DC starter 1 is easily worn down. As a result, the useful life of the DC starter is remarkably shortened. Therefore, the ECU 70 prohibits the idling stop afterward. Due to this, it can be prevented that the engine restart by the DC starter 1 is repeated many times, and the drivability deterioration responding to the start demand of the driver can be avoided and the solution of the problem about the durability of the DC starter 1 is possible.

In this case, in step S6 of the flow chart of the stop and start control shown in FIG. 10, the number of the failure of the stop control to the optimal crank angle stop position is counted, and the number is compared with a predetermined number. If the counted number is larger than the predetermined number, the ECU 70 determines that a certain problem happens to the stop control function, and inhibits the idling stop afterward. Due to this, since it can be prevented that the engine restart is executed many times by the DC starter 1, the problem about the durability of the DC starter 1 can be solved. It is noted that the setting for inhibiting the idling stop can be released when the problem of the stop control method is solved.

(2nd Embodiment)

Next, the second embodiment will be explained. In the first embodiment, it is detected, by the crank angle sensor, whether or not the engine is successfully stopped at the optimal crank angle stop position after the engine automatic stop control for the idling stop. Instead, in the second embodiment, the detection is executed by utilizing the estimating processing of the crank angle.

When the crank angle estimation is executed, there is high probability that the estimating accuracy of the crank angle stop position is not enough, if the problems happen to the crank angle sensor 90 and the motor sensor 3a. In such a case, similarly to the above-described first method, the ECU 70 does not perform the automatic engine restart by the motor generator 3, and instead, starts the engine 2 by the DC starter 1 having the larger output torque.

When the estimating accuracy of the crank angle stop position is low, for example, the reliability that the actual crank angle stop position is within the optimal crank angle 90° CA to 120° CA is low. Even though the estimating accuracy of the crank angle stop position is low, there is no problem if the crank angle stop position is actually within the crank angle 90° CA to 120° CA. However, if the crank angle stop position is not within the crank angle 90° CA to 120° CA, the engine starting load becomes large, and it is possible that the automatic engine restart by the motor generator 3 fails. Thus, in order to promptly and reliably restart the engine 2, when the estimating accuracy of the crank angle stop position is low, regardless of the actual crank angle stop position, the ECU 70 avoids the automatic engine restart by the motor generator 3, and starts the engine by the DC starter 1 having the larger output torque. Thus, the engine restart from the idling stop can be reliably performed.

Figure 11:
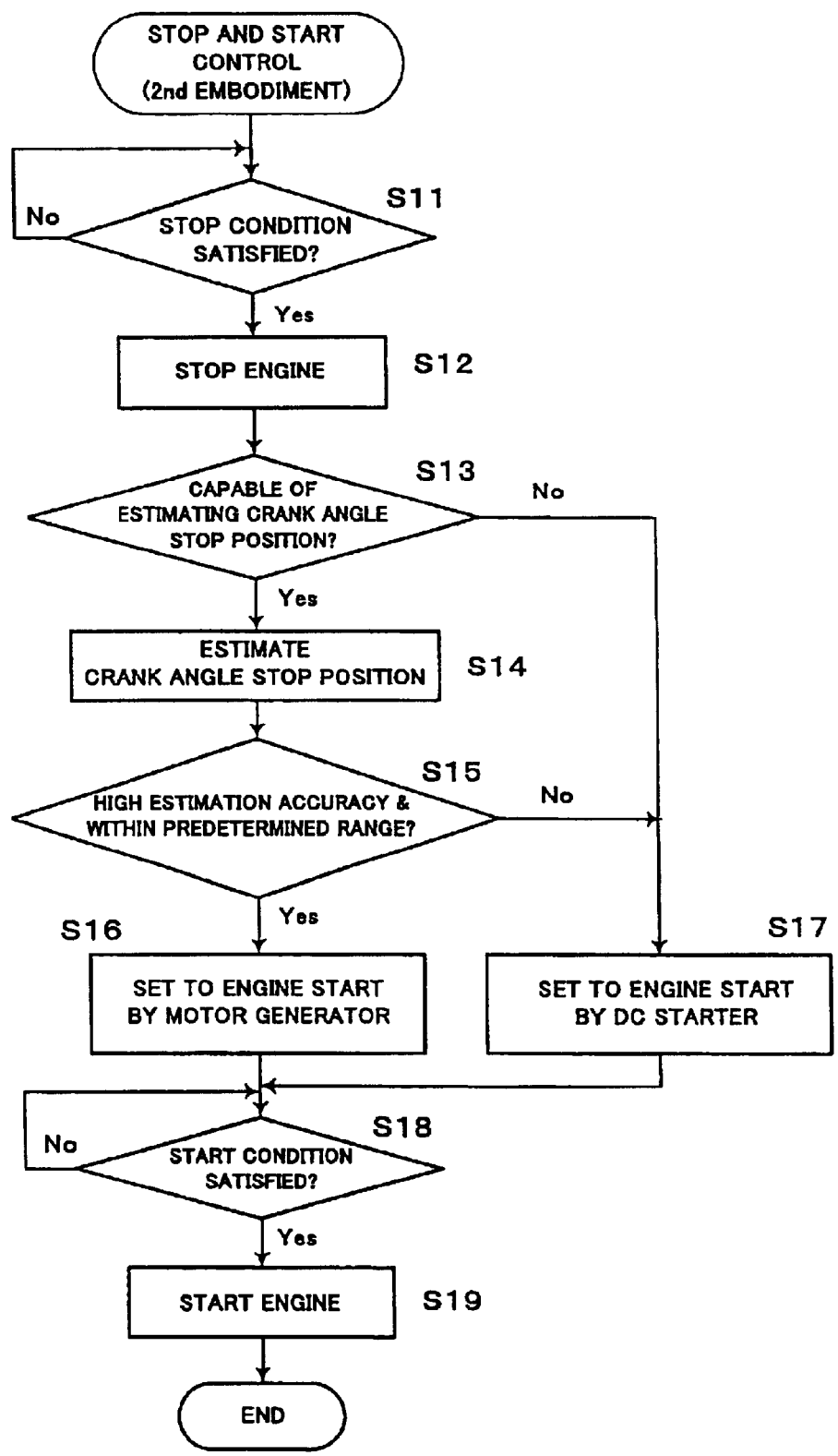
FIG. 11 shows a flowchart of an engine stop and start control according to the second embodiment.

Next, the flow of the stop and start control in the second embodiment will be explained. FIG. 11 is a flow chart showing the stop and start control of the engine according to the second embodiment. It is noted that the ECU 70 executes the stop and start control, basically based on the output signals from various sensors.

In the flow chart shown in the FIG. 11, the identical portions to those in the flow chart shown in FIG. 10 are briefly explained.

First, in step S11, when the engine stop condition is satisfied, the processing moves to step S12. By this, the engine 2 stops, and the crank angle is controlled to stop at the optimal crank angle stop position.

Next, in step S13, based on the output signal from the crank angle sensor 90 and the motor sensor 3a, the ECU 70 determines whether or not the estimation of the crank angle stop position is possible. In concrete, the ECU 70 determines whether or not the output signals are appropriately obtained from the crank angle sensor 90 and the motor angle sensor 3a. When the estimation of the crank angle stop position is possible, the processing moves to step S14 (step S13; Yes).

On the other hand, when the estimation of the crank angle stop position is impossible, the processing moves to step S17 (step S13; No). When the estimation of the crank angle stop position is impossible, the motor control unit 4 cannot execute the estimation of the crank angle stop position. Therefore, in order to promptly and reliably restart the engine 2, the ECU 70 sets the next engine start method to the engine start by the DC starter 1 (step S17).

In step S14, the motor control unit 4 executes the estimation of the crank angle stop position based on the command signal from the ECU 70. The motor control unit 4 executes the estimation of the crank angle stop position by utilizing the MG position signal from the motor angle sensor 3$a$, the NE signal from the crank angle sensor 90 and the TDC signal from the ECU 70, in the above-described method.

In step S15, the ECU 70 refers the above-described estimation accuracy flag, and determines whether or not the estimation accuracy of the crank angle stop position is high. Also, at the same time, the ECU 70 determines whether or not the estimated crank angle is within the predetermined range, i.e., whether or not the vehicle is controlled to stop at the optimal crank angle stop position. When the estimation accuracy of the crank angle stop position is high and the estimated crank angle is within the predetermined range, the ECU 70 sets the next start method of the engine 2 to the engine start by the motor generator 3 (step S16). On the other hand, either when the estimation accuracy of the crank angle stop position is low or when the estimated crank angle is not within the predetermined range, the ECU 70 sets the next start method of the engine 2 to the engine start by the DC starter 1 (step S17). Like this, since the optimal engine start method is selected according to the estimation accuracy of the crank angle stop position after the stop control, the restart of the engine 2 can be promptly and reliably executed.

Next, in step S18, the ECU 70 determines whether or not the engine start condition is satisfied, for example, the driver takes his or her foot off the brake pedal (the brake pedal is OFF). When the engine start condition is satisfied, the ECU 70 starts the engine 2 by the engine start method which is set in step S16 or S17 (step S19).

As explained above, according to the stop and start control in the second embodiment, the optimal engine start method can be selected by taking account of the estimation accuracy of the crank angle stop position after the stop control, and hence the next restart of the engine 2 can be promptly and reliably executed.

Similarly to the first embodiment, when the estimating the crank angle stop position repeatedly becomes impossible for a predetermined time after the idling stop and the control to the optimal crank angle stop position are performed for several times, the ECU 70 can determines that a certain problem happens to the estimating processing of the crank angle and inhibit the idling stop afterward. Thus, it can be prevented that the engine restart is repeated many times by the DC starter 1, and the problem about the durability of the DC starter 1 can be solved.

In this case, in step S17 of the flow chart of the stop and start control shown in FIG. 11, the number of the failure of the stop control to the optimal crank angle stop position is counted, and the counted number is compared with the predetermined number. If the counted number is larger than the predetermined number, the ECU 70 determines that the problem happens to the estimating processing of the crank angle and inhibits the idling stop afterward. By this, since it can be prevented that the engine restart is executed many times by the DC starter 1, the problem about the durability of the DC starter 1 can be solved. It is noted that the setting of the idling stop inhibition can be released when the problem of the stop control method is solved.

(3rd Embodiment)

Next, the third embodiment will be explained.

Even though the stop control of the engine is succeeded and the engine is successfully stopped at the optimal crank angle stop position, the vehicle 10 may be moved by an accidental force. The third embodiment is characterized in that, in such a case, the automatic engine restart by the motor generator 3 is avoided and the control is changed to the engine restart method by the DC starter 1.

There are some cases that the vehicle 10 is moved by the accidental force. For example, when the vehicle 10 of automatic transmission (hereafter, it is called "AT vehicle") performs idling stop on a steep-slope of climbing lane with the wheels 8 being connected to the power transmission system 7 (e.g., a drive mode), the AT vehicle may happen to be slowly moved by the slope of the climbing lane. Also, when the AT vehicle performs idling stop in the drive mode, the AT vehicle can be intentionally moved.

In those cases, since the wheels 8, the power transmission system 7 and the engine 2 are structurally connected to each other, the crankshaft is rotated according to the rotation of the wheels 8. Due to this, the crank angle at the optimal crank angle stop position can get out of the range of the optimal crank angle stop position. If the crank angle becomes out of the range of the optimal crank angle stop position, the engine start load in starting the engine becomes large. Because of this, the probability that the automatic engine restart by the motor generator 3 fails becomes high. Therefore, when the crank angle gets out of the range of the optimal crank angle stop position, the ECU 70 avoids the automatic engine restart by the motor generator 3 and selects the engine starting by the DC starter 1 having the larger output torque, in order to reliably start the engine.

In concrete, after the vehicle is stopped by the engine stop control and before the engine is automatically started next time, the ECU 70 detects the crank angle by the crank angle sensor 90 capable of detecting the absolute crank angle, and determines whether or not the detected crank angle is within the range of the optimal crank angle stop position. When the detected crank angle is within the range of the optimal crank angle stop position, the ECU 70 executes the next automatic engine restart by the motor generator 3. On the other hand, when the detected crank angle is out of the range of the optimal crank angle stop position, the ECU 70 executes the next engine automatic start by the DC starter 1 having the larger output torque.

If the automatic engine restart is still tried by the motor generator 3, regardless of the fact that the actual crank angle is out of the range of the optimal crank angle stop position because of the crank angle position being moved after the stop of the vehicle, the automatic engine restart may fail. In that case, if the control is changed to the engine start method by the DC starter 1 after the failure of the automatic engine restart, it takes a very long time to actually start the engine. Therefore, in the third embodiment, when the crank angle is moved out of the range of the optimal crank angle stop position after the stop of the vehicle, the control is changed to the engine start by the DC starter 1, without trying the automatic engine start by the motor generator 3. Thus, the start of the engine 2 can be promptly and reliably executed.

Figure 12:
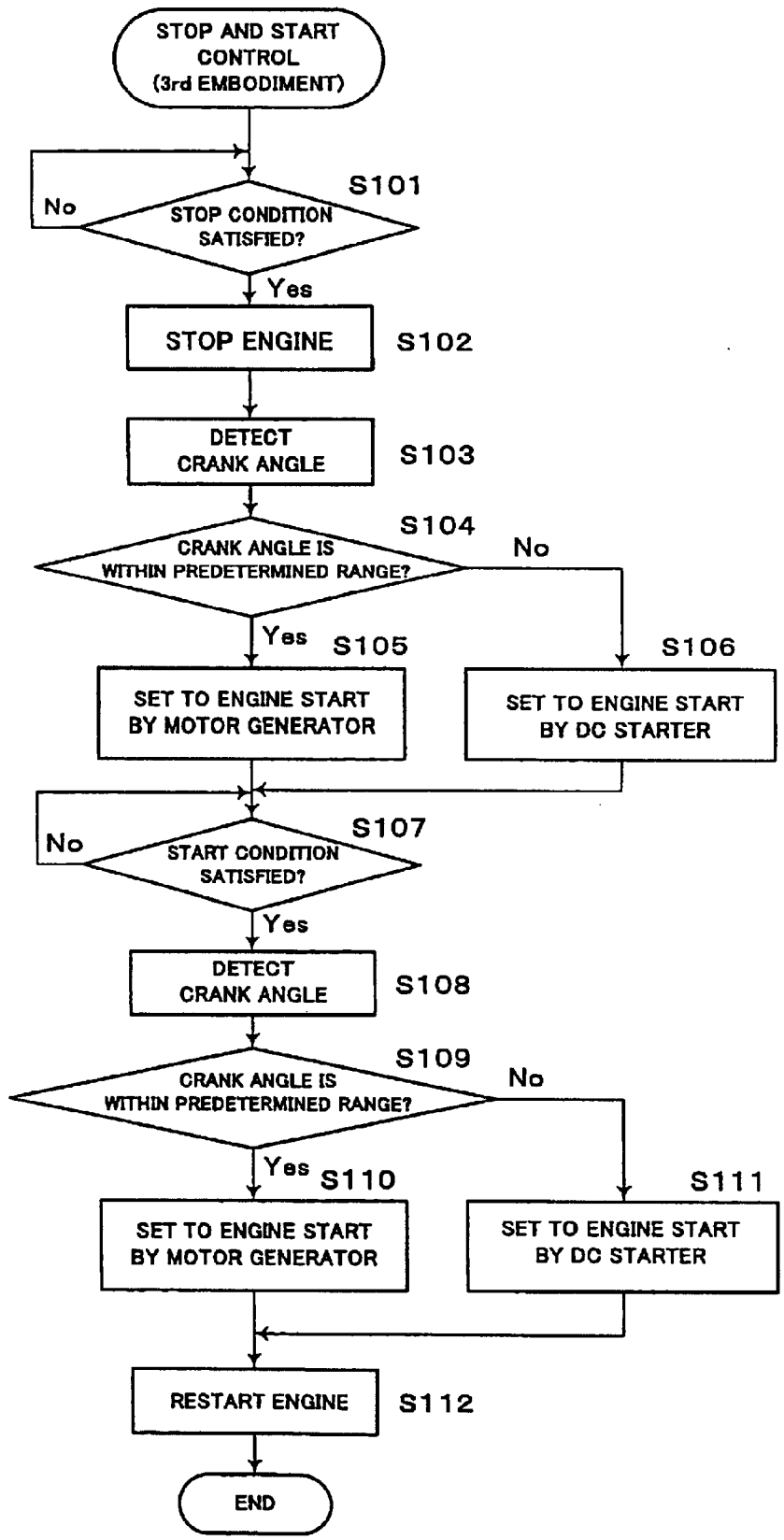
FIG. 12 shows a flow chart of an engine stop and start control according to the third embodiment.

Next, the description will be given of the flow of the engine stop and start control according to the third embodiment, with reference to FIG. 12. FIG. 12 is a flow chart showing the stop and start control of the third embodiment. It is noted that the ECU 70 executes the stop and start control, basically based on the output signals from various sensors.

In FIG. 12, processing of steps S101 to S107 are identical to the processing steps S1 to S7 in the flow chart of the first embodiment shown in FIG. 10. Namely, the crank angle is detected by the crank angle sensor after the stop control of the engine, and it is determined whether or not the detected crank angle is at the optimal crank angle stop position. Based on the determined result, the next engine starting method is set to the start either by the motor generator 3 or by the DC starter 1.

When it is determined that the engine start condition is satisfied in step S107, the ECU 70 executes the detection of the crank angle by utilizing the crank angle sensor again, before the engine start. In short, the ECU 70 confirms that the crank angle does not change after the stop of the vehicle. In steps S108 to S111, the processing identical to the processing in steps S103 to S106 is performed. Namely, when the crank angle is at the optimal crank angle stop position immediately before the automatic engine start, the start by the motor generator 3 is set. When the crank angle is not at the optimal crank angle stop position, the start by the DC starter 1 is set. Next, in step S112, the ECU 70 restarts the engine by the engine start method which is set in step S110 or S111. By this, the engine restart can be promptly and reliably performed.

(Modification)

In the third embodiment, it is determined whether or not the crank angle is controlled to stop at the optimal crank angle stop position, both after the engine stop and immediately before the engine start. However, it may be determined whether or not the crank angle is controlled to stop at the optimal crank angle stop position only immediately before the engine start, and the next engine start method may be set in accordance with the detected result.

In the above-described embodiment, when the stop control to the optimal crank angle stop position is succeeded, the next engine start is performed by the motor generator 3. Instead, the system can be configured such that the fuel injection is performed to the predetermined cylinder which is in the expansion stroke of in the stop control in advance, and when the stop control to the optimal crank angle stop position is succeeded, the fuel is combusted to generate explosion energy to start the engine 2 at the time of starting the engine.

As explained above, according to the present invention, by executing the detection or the estimation of the crank angle stop position after the engine stop control, the restart of the internal combustion engine can be performed in the prompt and reliable manner, in accordance with the crank angle state after the stop control.

Moreover, if the crank angle stop position is confirmed again immediately before starting the engine, the restart of the internal combustion engine can be performed in the prompt and reliable manner, even if the crank angle stop position is changed in some reasons after the engine stop control.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2003-027253 filed on Feb. 4, 2003 including the specification, claims, drawings and summary is incorporated herein by reference in its entirety.

What is claimed is:

1. A stop and start control apparatus of an internal combustion engine comprising:

a stop control unit which controls a crank angle of the internal combustion engine within a range of a predetermined crank angle at a time of stopping the internal combustion engine; and a start control unit which starts the internal combustion engine by a cranking unit at a time of starting the internal combustion engine, wherein the start control unit starts the internal combustion engine by different methods when there is a probability that the internal combustion engine does not stop within the range of the predetermined crank angle and when the internal combustion engine stops within the range of the predetermined crank angle.

2. The stop and start control apparatus of the internal combustion engine according to claim 1, wherein the cranking unit is an electric motor, and wherein the start control unit starts the internal combustion engine by applying, by the electric motor, a larger torque when there is a probability that the internal combustion engine does not stop within the range of the predetermined crank angle than when the internal combustion engine stops within the range of the predetermined crank angle.

3. The stop and start control apparatus of the internal combustion engine according to claim 1, wherein the start control unit starts the internal combustion engine by a first electric motor when the internal combustion engine stops within the range of the predetermined crank angle, and by a second electric motor different from the first electric motor when there is a probability that the internal combustion engine does not stop within the range of the predetermined crank angle.

4. The stop and start control apparatus of the internal combustion engine according to claim 3, wherein the first electric motor is a motor generator functioning as a motor and an electric generator, and wherein the second electric motor is a DC starter functioning as a motor.

5. The stop and start control apparatus of the internal combustion engine according to claim 2, wherein the start control unit starts the internal combustion engine by combusting, during an expansion stroke, a fuel supplied at the time of stopping the internal combustion engine when the internal combustion engine stops within the range of the predetermined crank angle, and wherein the start control unit starts the internal combustion engine by the electric motor when there is a probability that the internal combustion engine does not stop within the range of the predetermined crank angle.

6. The stop and start control apparatus of the internal combustion engine according to claim 1, wherein a case when there is a probability that the internal combustion engine does not stop within the range of the predetermined crank angle includes a case when an actual crank angle at the time of stopping the internal combustion engine is out of the range of the predetermined crank angle.

7. The stop and start control apparatus of the internal combustion engine according to claim 6, wherein the actual crank angle is outputted from a crank angle sensor detecting the crank angle of the internal combustion engine.

8. The stop and start control apparatus of the internal combustion engine according to claim 1, wherein a case when there is a probability that the internal combustion engine does not stop within the range of the predetermined crank angle includes a case when an estimation accuracy of an estimating processing of the crank angle at the time of stopping the internal combustion engine is smaller than a predetermined standard.

9. The stop and start control apparatus of the internal combustion engine according to claim 8, wherein the estimating processing estimates the crank angle based on an output from the crank angle sensor of the internal combustion engine and a rotation detecting output from the electric motor functioning as the cranking unit.

10. The stop and start control apparatus of the internal combustion engine according to claim 9, wherein the estimating processing corrects the rotation detecting output from the electric motor by the output from the crank angle sensor.

11. The stop and start control apparatus of the internal combustion engine according to claim 1, wherein a case when there is a probability that the internal combustion engine does not stop within the range of the predetermined crank angle includes a case when there is a probability that the crank angle changes after the stop of the internal combustion engine.

12. The stop and start control apparatus of the internal combustion engine according to claim 11, wherein a case when there is a probability that the crank angle changes includes a case when the crank angle changes by receiving an external force after the stop of the internal combustion engine.

13. The stop and start control apparatus of the internal combustion engine according to claim 1, wherein the stop control unit automatically stops the internal combustion engine when a predetermined stop condition is satisfied, and wherein the start control unit automatically starts the internal combustion engine when a predetermined start condition is satisfied.

* * * * *